(12) United States Patent
Farooq et al.

(10) Patent No.: US 11,539,508 B2
(45) Date of Patent: *Dec. 27, 2022

(54) ENCRYPTION CIRCUIT RANDOMNESS INSPECTOR AND METHOD

(71) Applicant: Wi-LAN Research Inc., Vista, CA (US)

(72) Inventors: Muddassar Farooq, Islamabad (PK); Muhammad Rashad Ramzan, Islamabad (PK); Kenneth Stanwood, Vista, CA (US)

(73) Assignee: Wi-LAN Research Inc., Vista, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/119,257

(22) Filed: Dec. 11, 2020

(65) Prior Publication Data

US 2022/0166603 A1 May 26, 2022

Related U.S. Application Data

(60) Provisional application No. 63/116,757, filed on Nov. 20, 2020.

(51) Int. Cl.
*H04L 29/06* (2006.01)
*G06F 21/00* (2013.01)
(Continued)

(52) U.S. Cl.
CPC ............ *H04L 9/0637* (2013.01); *H04L 9/065* (2013.01); *H04L 9/085* (2013.01); *H04L 9/0869* (2013.01)

(58) Field of Classification Search
CPC ....... H04L 9/0637; H04L 9/065; H04L 9/085; H04L 9/0869; H04L 63/0428; H04W 12/00
See application file for complete search history.

(56) References Cited

U.S. PATENT DOCUMENTS 7,949,012 B2   5/2011   Chang et al.
9,191,823 B2   11/2015  Rieger et al.
(Continued)

OTHER PUBLICATIONS

Y. Nawaz, et al. "Algebraic Immunity of S-Boxes Based on Power Mappings: Analysis and Construction," IEEE Transactions on Information Theory, vol. 55, No. 9, pp. 4263-4273, Sep. 2009.
(Continued)

*Primary Examiner* — Lisa C Lewis
(74) *Attorney, Agent, or Firm* — Philip E. Levy; Eckert Seamans Cherin & Mellott, LLC

(57) ABSTRACT

A baseband processor of a communication device, the baseband processor including an encryptor block that encrypts a transmit data stream into an encrypted data stream, at least one transmit chain block that transforms the encrypted data stream into an analog transmit signal, and a randomness inspector unit that is in communication with the encryptor block, the randomness inspector unit accessing the transmit data stream and the encrypted data stream from the encryptor block as first and second input streams, respectively, to the randomness inspector unit, and determining a randomness gain by comparing a first randomness measurement associated with the first input stream to a second randomness measurement associated with the second input stream.

20 Claims, 25 Drawing Sheets

(51) Int. Cl.
*H04L 9/06* (2006.01)
*H04L 9/08* (2006.01)

(56) References Cited

U.S. PATENT DOCUMENTS

| | | | | |
|---|---|---|---|---|
| 9,336,402 | B2* | 5/2016 | Wong | G06F 21/34 |
| 2013/0167228 | A1* | 6/2013 | Wong | G06F 21/62 |
| | | | | 726/19 |
| 2016/0118142 | A1* | 4/2016 | Sugahara | G11C 29/36 |
| | | | | 714/719 |

OTHER PUBLICATIONS

E.F. Brickell, et al. "Structure in the S-Boxes of the DES," Advances in Cryptology—Crypto 86, LNCS, vol. 263, pp 3-8, Dec. 2000.

J. Pieprzyk, et al. "Towards effective nonlinear cryptosystem design," IEE Proceedings—Computers and Digital Techniques, vol. 135, Pt. E, No. 6, pp. 325-335, Nov. 1988.

NIST-FIPS Standard, "Announcing the advanced encryption standard (AES)", Federal Information Processing Standards Publication, vol. 197, pp. 1-51, Nov. 2001.

B. Schneier, et al. "Twofish: A 128-bit Block Cipher," NIST AES Proposal, vol. 15, Jun. 1998.

C. Burwick, et al., "MARS—a candidate cipher for AES," NIST AES Proposal (IBM Submission to AES), vol. 268, 1998 (Rev. Sep. 1999).

R. Anderson, et al. "Serpent: A proposal for the advanced encryption standard", NIST AES Proposal, vol. 174, pp. 1-23, 1998.

J. Soto Jr., "Randomness testing of the advanced encryption standard candidate algorithms", National Institute of Standards and Technology, pp. 1-9, Sep. 1999.

A. Rukhin, et al., "A statistical test suite for random and pseudorandom number generators for cryptographic applications", NIST Special Publication 800-22, Rev. 1a, Apr. 2010.

K. Aoki, et al., "Camellia: A 128-bit block cipher suitable for multiple platforms—design and analysis", Selected Areas in Cryptography 2000, LNCS 2012, pp. 39-56, Springer, 2001.

NIST Publication, "SKIPJACK and KEA algorithm specifications", Version 2, pp. 1-23 May 1998.

T. Shirai, et al., "The 128-Bit Blockcipher CLEFIA (Extended Abstract)", Fast Software Encryption 2000, LNCS vol. 4593, pp. 181-195, Springer Berlin Heidelberg, 2007.

B. Schneier, "Description of a new variable-length key, 64-bit block cipher (Blowfish)", Fast Software Encryption, LNCS vol. 809, pp. 191-204, Springer Berlin Heidelberg, 1994.

J. Wallen, "Design principles of the KASUMI block cipher", Proceedings of the Helsinki University of Technology Seminar on Network Security, Tik-100.501, 2000.

A. Sorkin, "Lucifer, a cryptographic algorithm", Cryptologia, vol. 8:1, pp. 22-42, Taylor & Francis, 1984.

W. Meier, et al. "Nonlinearity criteria for cryptographic functions", Advances in Cryptology, Eurocrypt '89, LNCS vol. 434, pp. 549-562, Springer, 1990.

A.F. Webster, et al. "On the design of s-boxes," Advances in Cryptology—Crypto '85 Proceedings, LNCS vol. 218, pp. 523-534, Springer, 1986.

M. Matsui, "New structure of block ciphers with provable security against differential and linear cryptanalysis," Fast Software Encryption, LNCS vol. 1039, pp. 205-218, Springer, 2005.

S. Hong, et al. "Provable Security against Differential and Linear Cryptanalysis for the SPN Structure", Fast Software Encryption 2000, LNCS vol. 1978, pp. 273-283, Springer 2001.

O. Kazymyrov, et al. "A Method For Generation Of High-Nonlinear S-Boxes Based On Gradient Descent", IACR Cryptology ePrint Archive, vol. 2013, pp. 578-586, 2013.

P. Rodwald, et al. "How to create 'good' s-boxes?", 1st International Conference for Young Researchers in Computer Science, Control, Electrical Engineering and Telecommunications (ICYR 2006), Zielona G'ora, Poland, Sep. 2006.

S. Picek, et al. "S-box, SET, Match: A Toolbox for S-box Analysis", Information Security Theory and Practice (WISTP 2014), Securing the Internet of Things, LNCS vol. 8501, pp. 140-149, IFIP 2014.

S. Kavut, et al. "There exist Boolean function on n (odd) variables having nonlinearity > 2n-1-2(n-1)/2 if and only if n > 7", IACR, Cryptology ePrint Archive, 2006.

M. Khan, et al. "A novel technique for the construction of strong s-boxes based on chaotic Lorenz systems", Nonlinear Dynamics 2012, vol. 70, pp. 2303-2311, Springer 2012.

\* cited by examiner

ENCRYPTION CIRCUIT RANDOMNESS INSPECTOR AND METHOD

CROSS-REFERENCE TO RELATED APPLICATIONS

This application claims the benefit of priority to U.S. Provisional Patent Application No. 63/116,757 filed on Nov. 20, 2020 and entitled "Encryption Circuit Randomness Inspector and Method", which is incorporated herein by reference.

FIELD OF THE INVENTION

The inventions described herein relate to a randomness inspector that determines the encryption strength of one or more components in an encryption circuit. The inventions herein further relate to a baseband processor, an application processor, a processor with a built in encryption circuitry, or a processor capable of running an encryption method in which a randomness inspector determines the encryption strength of one or more components of the processors mentioned in the above.

BACKGROUND

In general, encryption is commonly used to securely store data and to secure communications between devices. Encryption is standard in most cellular and broadband communications protocols today such as LTE, Wi-Fi, WiMAX, Bluetooth, virtual private networks (VPN), etc. and is expected to remain a standard as other forms of communications, such as low earth orbit (LEO) satellite networks, gain more use. Encryption has been and continues to be used in military communications, commercial, and private communications systems. These systems may be wired, wireless, satellite, RF, optical, acoustic, etc. Participating devices in such networks and systems may include but are not limited to laptop, personal computers, servers, cell phones, smartphones, satellite terminals and phones, satellites, ground stations, Internet of Things (IoT) devices, sensors, hard drives, external backup devices, cloud storage, communications network infrastructure, and any other device that may have the capability to exchange or store data.

An important challenge facing designers of an encryption method, encryption circuitry or any information scrambling system is to ensure, with a reasonable degree of reliability, that the encryption method (or circuit) has a high cryptographic strength that makes it infeasible for a cryptanalyst or any state or non-state adversary to apply brute force techniques to break the encryption key or compromise the associated cryptographic strength of the encryption ciphering or scrambling method or system. The known methods for checking the cryptographic strength of an encryption method or system are to utilize the encryption testing suites like the one proposed by National Institute of Standards and Technology (NIST) to measure the randomness of a block cipher or a stream cipher, generally consisting of confusion and diffusion modules, by treating the encryption or scrambling system as a black box such that the individual components or modules of the system are not visible or individually tested. The NIST test suite is only an example embodiment of a randomness testing suite, and test suites in general are not limited to NIST only. Some other known examples of encryption test suites are DieHarder, TestU01, ENT, and RNG Analysis. A shortcoming of the above-mentioned test suites—like NIST—is that they do not provide any insight into the component level strength of an encryption method, circuitry, or system. As a result, the designers and users of an encryption method or a scrambling system are unable to objectively evaluate the cryptographic strength of each of the components (constituent submodules) of the encryption method or a scrambling system. Such components can include, for example, the S-Box (sometimes referred to as a Confusion Box), the Mangling Function, the Rounds logic, and the key-expansion submodules. Consequently, it is not possible to know whether the encryption or scrambling system is composed of strong constituent submodules. A Mangling Function consists of either a Confusion Box or a Diffusion Box or a cascaded combination of both to encrypt or scramble the input data stream bits.

In an encryption method or a system, the confusion is introduced using a nonlinear S-box (sometimes referred to as a Confusion Box) that makes it difficult for a cryptanalyst to formulate its functionality by known linear functions and/or their transformations. A cryptographically strong S-box resists against linear, differential, and algebraic attacks. Some known design methods for designing and constructing S-boxes are: (1) random generation method; (2) weighted nonlinear Boolean functions; (3) non-linear transformation combined with a liner transformation using affine function (just like in AES); (4) applying round permutations on large number of small S-boxes; (5) pseudo-random number generation by applying Secure Hashing Algorithm-1 (SHA-1) that meets the required differential and linear criterion; and (6) key-dependent S-boxes (as in in Serpent). The eventual outcome of this design process is a mapping matrix with the following set of parameters: (1) the size of an S-box (number of elements); (2) the dimension of an S-box (number of rows and columns); and (3) the number of substituted bits (nibble, byte or 32 bits word). There is not seen to be an existing method, system or device that allows a user to benchmark the cryptographic strength of heterogeneous S-boxes of different encryption methods against each other especially when their designers are not willing to share the design and the mapping matrix of these S-boxes. Accordingly, there is not seen to be a method, system or device that could be used to benchmark the cryptographic strength of an S-box if the S-box is only shared as a black box in the form of a dll (or some other type of executable).

Similarly, the randomness introduced by the Diffusion, which scrambles the substituted data by directly permuting the substituted bits or using some partial functionality of the mangling function and further applying permutations and other logical operations in a round of an encryption method to avoid patterns in the cipher text, cannot be measured by existing cryptanalyzing techniques. The same is also true for the key-expansion or key-scheduling modules.

Encryption has important applications in wireless communication systems. In this regard, the International Telecommunication Union (ITU) defined three principle usage scenarios for 5G: Enhanced Mobile Broadband (eMBB), Ultra Reliable Low Latency Communications (uRLLC), and Massive Machine Type Communications (mMTC) and IoT applications. These services include the constraint to have low latency but with a high degree of both mobility and security. 5G applications and usage can be found in technical areas, such as, autonomous vehicles that have high safety dependency on reliability and latency; Industry 4.0 which facilitates the wireless control of industrial manufacturing; e-Health such as remote medical care and surgery; rescue support robot; public security; aviation; and other mission critical applications. The 5G/6G eMBB can be extended from conventional terrestrial communications to aerial communications such as unmanned aerial vehicle (UAV) cellular mmWave communications and low earth orbit (LEO) satellite communications.

Cloud virtualization technologies such as software-defined networks (SDN) and network functions virtualization (NFV) are new paradigms for 5G/6G networks. However, due to such technologies' open, flexible, and programmable nature they bring new security concerns. For example, a network element of an SDN, such as the management interfaces, could be used to attack the SDN controller or management system and compromise the security of the whole SDN system.

The detection of security threats in such communication and computing systems is the first step towards mitigating a security breach by an adversary. 5G/6G requires end-to-end security that automatically detects and mitigates all types of security breaches including information security breaches. However, as discussed above, known encryption testing techniques are not seen to provide the ability to test encryption strength of various components within an encryption system or circuit.

SUMMARY OF THE INVENTION

In an aspect, a baseband processor of a communication device is provided, the baseband processor including an encryptor block that encrypts a transmit data stream into an encrypted data stream, at least one transmit chain block that transforms the encrypted data stream into the analog transmit signal, and a randomness inspector unit that is in communication with the encryptor block, the randomness inspector unit accessing the transmit data stream and the encrypted data stream from the encryptor block as first and second input streams, respectively, to the randomness inspector unit, and determining a randomness gain by comparing a first randomness measurement associated with the first input stream to a second randomness measurement associated with the second input stream.

In another aspect, a baseband processor of a communication device is provided for transforming a received analog signal into a received data stream, the baseband processor including at least one receive chain block that transforms the received analog signal into a received encrypted data stream, a decryptor block that decrypts the received encrypted data stream into a received decrypted data stream, and a randomness inspector unit that is in communication with the decryptor block, the randomness inspector unit accessing the received decrypted data stream and the received encrypted data stream from the decryptor block as first and second input streams, respectively, to the randomness inspector unit, and determining a randomness gain by comparing a first randomness measurement associated with the first input stream to a second randomness measurement associated with the second input stream.

In a further aspect, an encryption circuit is provided for transforming an input data stream into an encrypted data stream, the encryption circuit including an encryptor block that encrypts the input data stream into the encrypted data stream, and a randomness inspector unit that is in communication with the encryptor block, the randomness inspector unit accessing the input data stream and the encrypted data stream from the encryptor block as first and second input streams, respectively, to the randomness inspector unit, and determining a randomness gain by comparing a first randomness measurement associated with the first input stream to a second randomness measurement associated with the second input stream.

In an aspect, a method is provided for determining a randomness gain associated with an encrypted data stream, the method comprising the steps of encrypting a transmit data stream into the encrypted data stream, transforming the encrypted data stream into an analog transmit signal, and conducting a randomness inspection that includes the steps of accessing the transmit data stream and the encrypted data stream, and determining the randomness gain by comparing a first randomness measurement associated with the transmit data stream to a second randomness measurement associated with the encrypted data stream.

In another aspect, a method is provided for determining a randomness gain associated with a received encrypted data stream, the method including the steps of transforming a received analog signal into the received encrypted data stream, decrypting the received encrypted data stream into a received decrypted data stream, conducting a randomness inspection that includes the steps of accessing the received decrypted data stream and the received encrypted data stream, and determining the randomness gain by comparing a first randomness measurement associated with the received decrypted data stream to a second randomness measurement associated with the received encrypted data stream.

In a further aspect, a method is provided for determining an encryption strength of an encryption circuit for transforming an input data stream into an encrypted data stream, the method comprising the steps of encrypting, by an encryption block in the encryption circuit, the input data stream into the encrypted data stream, and conducting a randomness inspection that includes the steps of accessing the input data stream and the encrypted data stream, and determining a randomness gain by comparing a first randomness measurement associated with the input data stream to a second randomness measurement associated with the encrypted data stream.

In an aspect, a randomness amplifier is provided for determining a randomness gain associated with an encryption block that transforms an input data stream into an encrypted data stream, the randomness amplifier including a randomness enhancer that applies the encryption block to the input data stream to generate the encrypted data stream, at least one randomness evaluator that applies at least one randomness test block to the input data stream to determine a first randomness measurement and that applies the at least one randomness test block to the encrypted data stream to determine a second randomness measurement, and a gain meter that determines a randomness gain by comparing the first randomness measurement associated with the input data stream to the second randomness measurement associated with the encrypted data stream.

In a further aspect, a benchmarked randomness inspector is provided for determining a randomness gain difference associated with at least two different data streams, the benchmarked randomness inspector including a randomness amplifier that receives a first input data stream as an input and applies a standard encryption block to the first input data stream to generate a standard encrypted data stream, and that determines a first randomness gain by comparing a first randomness measurement associated with the first input data stream to a second randomness measurement associated with the standard encrypted data stream, a randomness comparator that receives the first input data stream and a second encrypted data stream as inputs, the second encrypted data stream being generated by application of a second encryption block to the first input data stream, and that determines a second randomness gain by comparing the first randomness measurement associated with the first input data stream to a third randomness measurement associated with the second encrypted data stream, and a difference calculator that determines the randomness gain difference by comparing the first randomness gain to the second randomness gain.

In yet another aspect, a randomness amplifier is provided for determining a randomness gain associated with any one of a plurality of encryption blocks in a network stack, the randomness amplifier including a randomness enhancer that applies one of the plurality of encryption blocks to an input data stream to generate an encrypted data stream, at least one randomness evaluator that applies at least one randomness test block to the input data stream to determine a first randomness measurement and that applies the at least one randomness test block to the encrypted data stream to determine a second randomness measurement, and a randomness gain meter that determines a randomness gain by comparing the first randomness measurement associated with the input data stream to the second randomness measurement associated with the encrypted data stream.

In another aspect, a randomness comparator is provided for determining a randomness gain associated with any two of a plurality of data streams that includes at least two input data streams and at least two output encrypted data streams, the randomness comparator including at least one randomness evaluator that applies at least one randomness test block to a first one of the plurality of data streams to determine a first randomness measurement and that applies the at least one randomness test block to a second one of the plurality of data streams to determine a second randomness measurement, and a randomness gain meter that determines the randomness gain by comparing the first randomness measurement to the second randomness measurement.

In a further aspect, a differential randomness comparator for determining a randomness gain difference between a first randomness gain associated with a first randomness amplifier and a second randomness gain associated with a second randomness amplifier, the differential randomness comparator including a first randomness amplifier that receives a first input data stream as an input and applies a first encryption block to the first input data stream to generate a first encrypted data stream, and that determines a first randomness gain by comparing a first randomness measurement associated with the first input data stream to a second randomness measurement associated with the first encrypted data stream, a second randomness amplifier that receives a first input data stream as an input and applies a second encryption block to the first input data stream to generate a second encrypted data stream, and that determines a second randomness gain by comparing the first randomness measurement associated with the first input data stream to a third randomness measurement associated with the second encrypted data stream, and a difference calculator that determines the randomness gain difference by comparing the first randomness gain to the second randomness gain.

In an aspect, a randomness scope is provided for comparing a first set of randomness gain values associated with a first randomness amplifier to a second set of randomness gain values associated with a second randomness amplifier, the randomness scope including an input section that accesses the first set of randomness gain values from a first memory, the first set of randomness gain values including a separate randomness gain value generated by the first randomness amplifier using each one of a plurality of different encryption component blocks, and that accesses the second set of randomness gain values from a second memory, the second set of randomness gain values including a separate randomness gain value generated by the second randomness amplifier using each one of the plurality of different encryption component blocks, a randomness curve generator that generates a first set of randomness curves associated with the first set of randomness gain values and a second set of randomness curves associated with the second set of randomness gain values, and a randomness distance display that displays any of the first set of randomness curves and any of the first set of randomness curves based on one or more randomness curve selection inputs from a user interface, at least one randomness curve selection input being associated with one of the plurality of different encryption component blocks.

In another aspect, a deep cipher investigator is provided for determining whether one or more of a first plurality of different encryption component blocks is in a compromised state, the deep cipher investigator including a first randomness amplifier that generates a first set of randomness gain values including a separate randomness gain value generated by the first randomness amplifier using each one of the first plurality of different encryption component blocks, a second randomness amplifier that generates a second set of randomness gain values including a separate randomness gain value generated by the second randomness amplifier using each one of a second plurality of different encryption component blocks, a randomness curve generator that generates a first set of randomness curves associated with the first set of randomness gain values and a second set of randomness curves associated with the second set of randomness gain values, and a randomness display that displays any of the first set of randomness curves and any of the second set of randomness curves, wherein a comparison of at least one of the first set of randomness curves to at least one of the second set of randomness curves determines whether one or more of the first plurality of different encryption component blocks is in a compromised state.

The foregoing aspects, and other features and advantages of the invention, will be apparent from the following, more particular description of aspects of the invention, the accompanying drawings, and the claims.

BRIEF DESCRIPTION OF THE DRAWINGS

Details of one or more implementations of the subject matter of the invention are set forth in the accompanying drawings briefly described below and the related description set forth herein. Other objects, features, aspects, and advantages will become apparent from the description, the drawings, and the claims. Note that the relative dimensions of the drawings may not be drawn to scale. Like reference numbers and designations in the various drawings indicate like elements.

DETAILED DESCRIPTION

Aspects of the present invention and their advantages may be understood by referring to the figures and the following description. The descriptions and features disclosed herein can be applied to various devices, systems, software, and methods in encryption circuits and systems, such as for example in a baseband processor of a communication system device or in an application processor of a user equipment device or in any general purpose processor having built in encryption circuitry or that is capable of running an encryption method.

In an aspect of the present invention, an encryption circuit such as a baseband processor includes a randomness inspector that determines the randomness strength of an output data stream relative to the input data stream of one or more components of the circuit (baseband processor).

Figure 1:
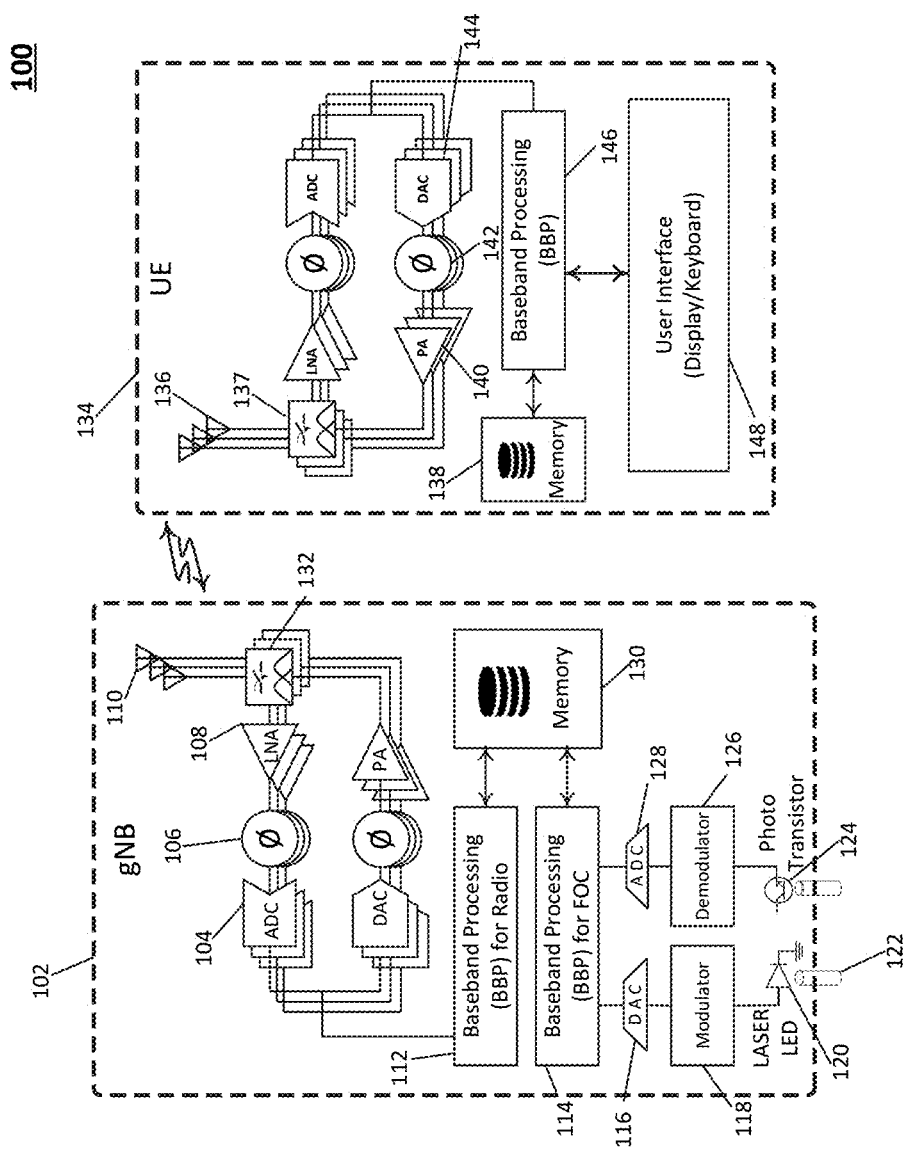
FIG. 1 is a top-level diagram of a typical transceiver architecture for a broadband MIMO wireless radio and/or fiber optic communication system.

FIG. 1 shows a top-level block diagram of a typical transceiver architecture of devices in a broadband MIMO wireless radio communication system 100, which also includes a fiber optic interface. As seen in FIG. 1, a flexible wireless transceiver architecture is shown for devices gNB (NodeB, or base station) 102 and UE (user equipment) 134 that is typical for a 5G or high order MIMO (sub-6 GHz 5G NR) system, a 5G or higher mmWave system, an IEEE 802.11a/b/g/n/ac/ax system, an IEEE 802.11ad/ay system, a WiGig system, a Bluetooth system, a GNSS system, a 5G-CA system, a 5G-LAA system, etc. The gNB 102 of multiple antenna MMIMO system 100 consists of antenna 110, the LNA (Low Noise Amplifier) and PA (Power Amplifier) 108, the Duplexer and Time Switch (TS) 132, and Phase Shifter ($\phi$) 106 which are analog components working at GHz frequencies, and ADC and DAC 104 which are mixed signal components. In the case of the FDD (Frequency Division Duplex) system the duplexer is utilized but is replaced with the Time Switch (TS) in the case of a Time Division Duplexing (TDD) system. gNB 102 also includes baseband processor 112 for radio communication. The components of UE (User Equipment) 134 are similar to that of gNB 102, and include antenna 136, the LNA (Low Noise Amplifier) and PA (Power Amplifier) 140, the Duplexer and Time Switch (TS) 137, and Phase Shifter ($\phi$) 142 which are analog components working at GHz frequencies, and ADC and DAC 144. UE 134 can be an IoT machine or a human user device and has one or multiple Baseband Processors (BBP) 146 depending upon the chip architecture, necessary processing power, and schemes used for low power operation. On the gNB 102 (base station or BT) side, in addition to the above mentioned hardware blocks, a Fiber Optic (FO) interface is also present in order to connect the base station with a cloud-based IT infrastructure (such as for backhaul). The FO interface has its own dedicated BBP 114, and in the transmission chain also includes DAC 116, modulator 118, and laser LED 120 (for outgoing fiber optic medium 122), The FO interface includes in its receive chain phototransistor 124 (for receiving signals from fiber optic medium), demodulator 126 and ADC 128. Memory 130 is also provided in gNB 102 to store data for BBPs 112 and 114. Similarly, UE 134 also includes memory 138 to store data for BBP 146. UE also includes user interface 148 which may be a display, keyboard, touchscreen, buttons, sensors, and or other known types of user interface devices.

From the functional point of view, the BBPs of the UE, the BS, and the FO are all similar. The BBPs have their own specific architecture and a dedicated operating system. All the digital functions are implemented in the BBP, which includes coding, interleaving, equalization, estimation, compression, sampling, rate conversion, transformation, pulse shaping and modulation etc. Encryption methods are utilized in gNB 102 and UE 134 and are implemented in the baseband processor(s) of each. Aspects of the invention as described herein may be implemented in or applied to the BBP of a UE, BS, or FO. In this regard, aspects of the invention as described as herein may be implemented in or applied to the BBP (communications link encryption) for communications with the UE, for the BS airlink, and also the BS backhaul. Aspects of the invention as described herein may also be implemented in or applied to an application processor, especially for example an application processor of a UE that supports UE end-to-end encryption.

Figure 2:
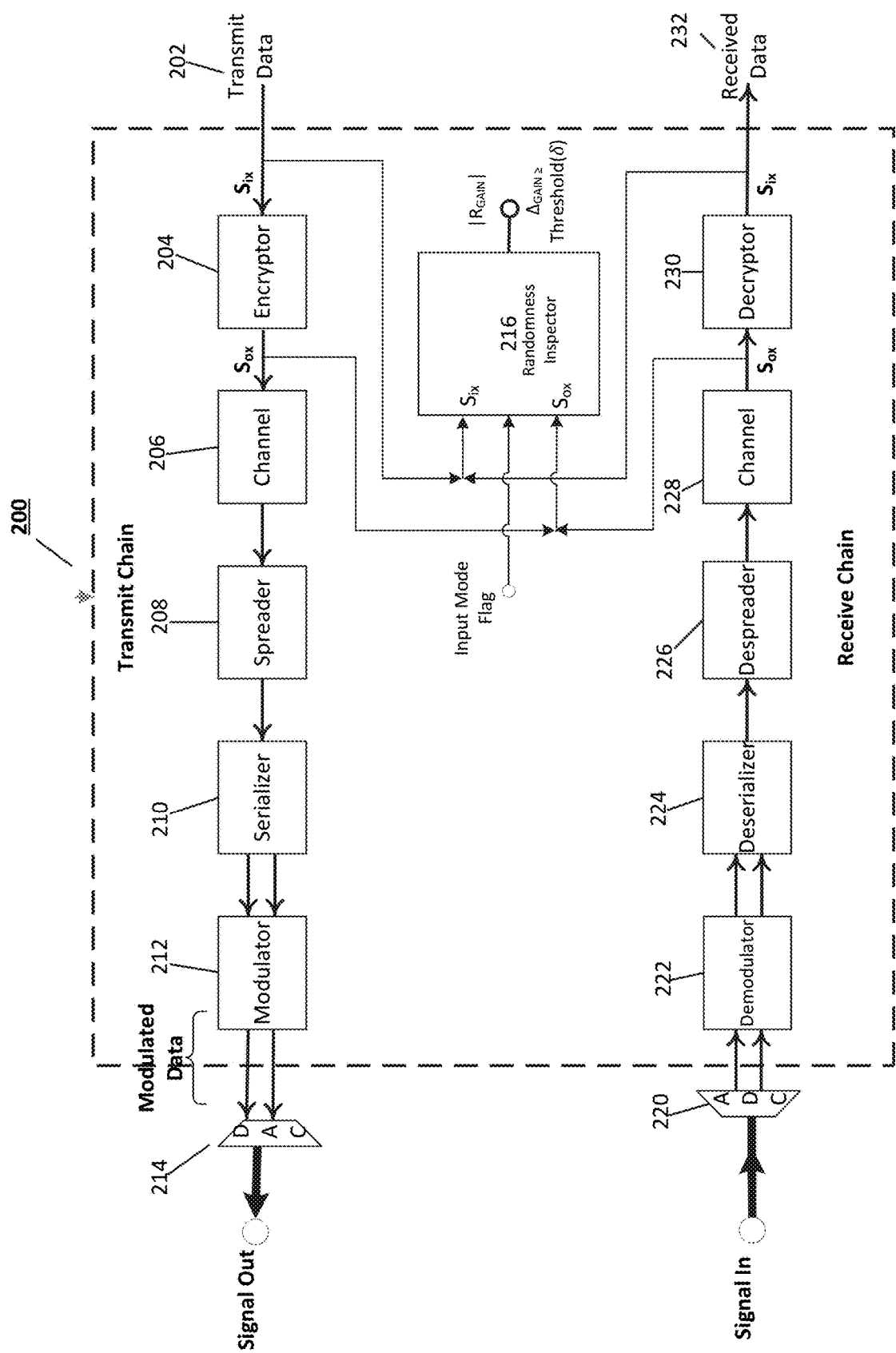
FIG. 2 is a functional diagram depicting a baseband processor with a randomness inspector according to aspects of the invention.

FIG. 2 is a functional diagram of a baseband processor 200, such as BPP 146 of FIG. 1, wherein the baseband processor includes a randomness inspector 216 according to aspects of the invention. As seen in FIG. 2, baseband processor (BBP) 200 is shown which is suitable for different types of radios and FOC systems. BBP 200 consists of, but is not limited to, Encryptor 204, Channel Selection 206, Spreader 208, Serializer 210, and Modulator 212 in the transmit chain. As seen in the transmit chain, Transmit Data 202 is input to BBP 200 which processes it by blocks 204 to 212 and outputs modulated data to DAC 214 to thereby result in an analog output signal, such as for transmission. In the receiver chain of BBP 200, the main blocks are Demodulator 222, Deserializer 224, Despreader 226, Channel Deselection 228, and Decryptor 230. As seen in the receiver chain, an analog signal-in (such as from an antenna) is input to ADC 220 which sends modulated data into BBP 200 in which it is processed by blocks 222 to 230 and outputs decrypted received data 232. These above-mentioned blocks make up the main part of any kind of BPP present in typical radio and fiber optic (FO) communication systems. BBP 200 also includes Randomness Inspector 216.

According to an aspect of the invention, Randomness Inspector 216 computes the randomness gain between two data streams and may also compute a randomness distance of two data streams. The randomness gain and/or the randomness distance can be used to find out whether the encryption method applied between the two data streams (such as input and output data streams) is defective or has been compromised or disabled by an adversary attack. In case of a problem or security breach of the encryption method, BPP 200 can alert the system (such as the operating system of a gNB or a UE) to take the mitigation countermeasures. Randomness Inspector 216 can be implemented using the existing resources in BPP 200 or a dedicated hardware and can be realized within the baseband processor chip or a separate security chip.

As seen in FIG. 2, the data stream under investigation can be the tapped from the output of Encryptor block 204 to determine a problem or compromise in the encryption of that particular block, and the severity and the type of an adversary attack. This investigation can be applied on the whole band, a sub-band, or a complete channel of the sub channels of the TDMA and FDMA, CDMA or spread spectrum systems.

In order to detect the attack, the input $S_{ix}$ and output $S_{ox}$ of Encryptor block 204 are tied to the two inputs $S_{ix}$ and $S_{ox}$ of Randomness Inspector 216, respectively. $|R_{GAIN}|$ values computed inside the Randomness Inspector 216 measure the randomness distance between input and output data streams. $|R_{GAIN}|$ and both $S_{ix}$ and output $S_{ox}$ can be used directly or stored in a memory (not shown) for a later use.

Randomness Inspector 216 can be comprised of comparator blocks as described further below with respect to FIG. 3. In this manner, if Encryptor 204 is enabled then $|R_{GAIN}|$ of the top comparator block inside the Randomness Inspector 216 should correspond to a high randomness distance between the two data streams, and $\Delta_{GAIN}$ of the bottom comparator block inside the Randomness Inspector 216 should correspond to a difference between reference and measured randomness differences that is less than a threshold; otherwise, Encryptor 204 may have been turned off or degraded to a fake encryptor such as ILLUZIJA (a pseudo name for a fake encryptor that simply copies an input stream to the output stream) and hence this compromise could be easily detected. An undetected ILLUZIJA attack could significantly reduce the cryptographic strength of the output ciphered data stream $S_{ox}$ and accordingly would lead to a security breach of the information in that data stream.

The outputs of Randomness Inspector 216 are a randomness distance measure $|R_{GAIN}|$ between the reference stream ($S_{ix}$) and the data stream under investigation ($S_{ox}$) and the difference ($\Delta$) between reference and measured randomness differences $|R_{GAIN-REF}|$ and $|R_{GAIN}|$. If the difference ($\Delta$) between reference randomness difference $|R_{GAIN-REF}|$ and the measured randomness difference $|R_{GAIN}|$ for the two data streams is more than a threshold ($\delta$), then the system is determined to have been compromised; and thus, may enable the system controller to take appropriate steps to mitigate the adverse effects of this type of encryption defect or security attack. Reference randomness difference $|R_{GAIN-REF}|$ may be, for instance, a calculation of the long-term randomness gain of a well-known encryption scheme such as AES. As seen in FIG. 2, Randomness Inspector 216 can also perform the same functions as described above with regard to the receive chain of BBP 200. Specifically, input $S_{ox}$ (an encrypted data stream) and output $S_{ix}$ (a decrypted data stream) of Decryptor block 230 are also provided to the two inputs $S_{ix}$ and $S_{ox}$ of Randomness Inspector 216, respectively. Randomness Inspector 216 can determine whether to inspect the data streams from the transmit chain or the receive chain based on an Input Mode Flag which is input to Randomness Inspector 216 from a user interface or from memory. Similar to the above description regarding the inspection of data streams from encryptor 204, when Randomness Inspector 216 determines to inspect the data streams from the receive chain based on the Input Mode Flag, $|R_{GAIN}|$ values are computed inside Randomness Inspector 216 which measure the randomness distance between input and output data streams of Decryptor 230. $|R_{GAIN}|$ and both $S_{ix}$ and output $S_{ox}$ in this instance can be used directly or stored in a memory (not shown) for a later use. For example, in the case that Randomness Inspector 216 operates as shown in FIG. 3 and as discussed in more detail below, if Decryptor 230 is enabled then $|R_{GAIN}|$ of the top comparator block (such as randomness comparator 304 of FIG. 3) inside the Randomness Inspector 216 should correspond to a high randomness distance between the two data streams, and the $\Delta_{GAIN}$ of the bottom comparator block (such as randomness comparator 308 of FIG. 3) inside the Randomness Inspector 216 should correspond to a difference between reference and measured randomness differences that is more than a threshold; otherwise, Decryptor 230 may have been turned off or degraded to a fake decryptor such as ILLUZIJA (a pseudo name for a fake decryptor that simply copies an input stream to the output stream) and hence this compromise could be easily detected.

Figure 3:
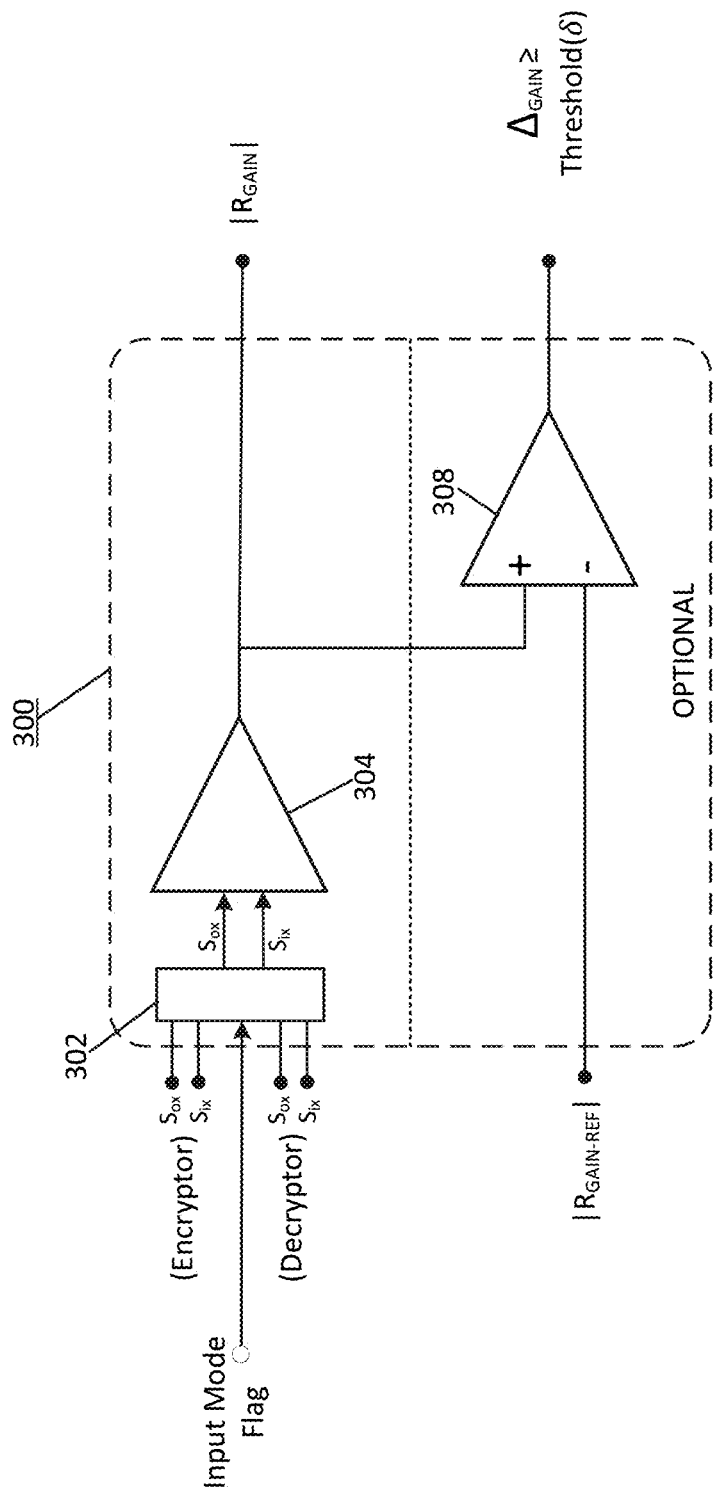
FIG. 3 is a functional diagram of a randomness inspector according to aspects of the invention.

FIG. 3 is a functional diagram of a randomness inspector according to aspects of the invention, such as for example Randomness Inspector 216 of FIG. 2. In FIG. 3, Randomness Inspector 300 is shown in which two data streams $S_{ix}$ and $S_{ox}$ are input from one of two sets of inputs (for example, inputs from either a transmit chain or a receive chain of a BPP). FIG. 3 shows two data streams $S_{ix}$ and $S_{ox}$ from an encryptor block and two data streams $S_{ix}$ and $S_{ox}$ from a decryptor block being provided to switch 302. In this regard, switch 302 can be located in Randomness Inspector 300 or can be located outside of Randomness Inspector 300, such as in a separate component or function of a circuit in which Randomness Inspector 300 resides, such as for example the BBP 200 shown in FIG. 2. Switch 302 can be implemented in a circuit, logic, or other known means. Alternatively, switch 302 may be optional in the case that Randomness Inspector 300 is configured to only accept inputs from an encryptor block (such as in the transmit chain of BBP 200) or to only accept inputs from a decryptor block (such as in the receive chain of BBP 200). An Input Mode Flag is also provided to switch 302 which instructs switch 302 whether to use the data streams $S_{ix}$ and $S_{ox}$ from the encryptor block or from the decryptor block and then output them as selected data streams $S_{ix}$ and $S_{ox}$ to the Comparator 304. In the case of using data streams from the encryptor block, $S_{ix}$ is an input data stream before encryption, and $S_{ox}$ is an output data stream after encryption. In the case of using data streams from the decryptor block, $S_{ox}$ is an input data stream before decryption, and $S_{ix}$ is an output data stream after decryption. These two data streams may represent the initial input data stream and final output data stream of an entire encryption chain or circuit (or decryption chain or circuit, as the case may be), or may represent different data streams from any different respective points, stages or components in an encryption chain or circuit (or decryption chain or circuit), such as a BPP for example. Comparator 304 of Randomness Inspector 300 determines a randomness gain $|R_{GAIN}|$ between input data streams $S_{ix}$ and $S_{ox}$, and may also optionally include a difference calculator 308 which calculates the difference between the $|R_{GAIN}|$ output of Randomness Comparator 304 and a reference $|R_{GAIN}|$. If the difference calculator 308 determines a difference (Δ) in the two $|R_{GAIN}|$ values that is more than a predetermined threshold (δ), then it is determined that the two data streams are not very close in randomness space and therefore may indicate an encryption or decryption problem, whichever the case may be.

Figure 19:
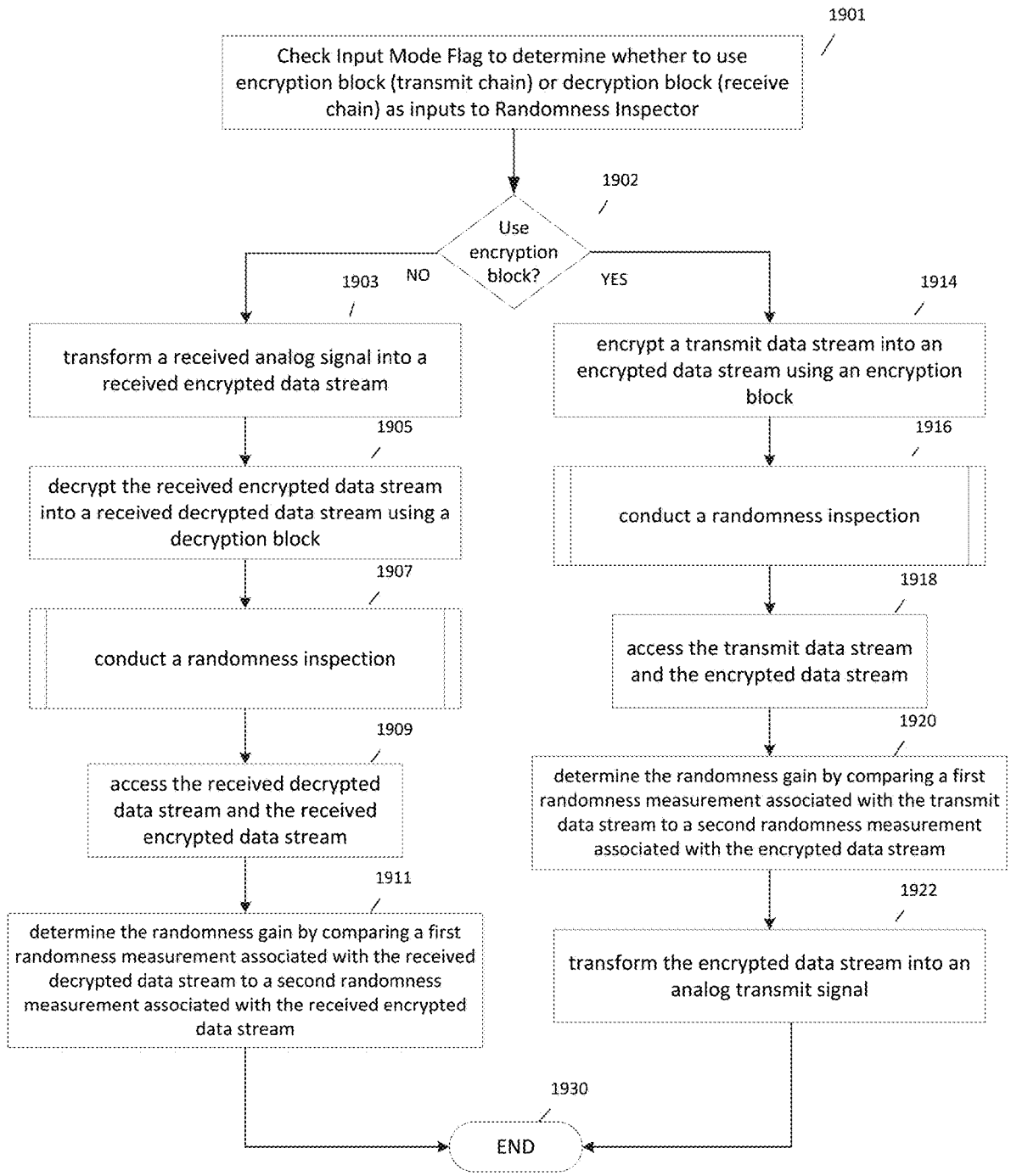
FIG. 19 is a flowchart depicting a process for a randomness inspection of at least one data stream in a circuit according to aspects of the invention.

FIG. 19 is a flowchart depicting a process for a randomness inspection of at least one data stream in a circuit according to an aspect. The process of FIG. 19 may apply to any circuit that includes an encryption or scrambling block, model, or process such as in a baseband processor circuit, an application processor circuit, or any other encryption or scrambling circuit. As seen in FIG. 19, the process begins at step 1901 in which the randomness inspector checks the input mode flag to determine whether to use input data streams from a block in the transmit chain (such as the encryption block) or from a block in the receive chain (such as the decryption block). In step 1902, the decision is made based on the input mode flag to use the encryption block (transmit chain) or the receive block (such as the decryption block) for inputs. If, in step 1902, it is decided to use the encryption block (or any other block in the transmit chain) the process moves to step 1914 which encrypts a transmit data stream into the encrypted data stream using the encryption block. Next, in step 1916, a randomness inspection is conducted that includes the step 1918 of accessing the transmit data stream and the encrypted data stream and the step 1920 of determining a randomness gain by comparing a first randomness measurement associated with the transmit data stream to a second randomness measurement associated with the encrypted data stream. Then in step 1922 the encrypted data stream is transformed into an analog transmit signal. The process then ends at step 1930.

If, in step 1902, it is decided not to use the encryption block (or any other block in the transmit chain) and instead to use the decryption block (or any other block in the receive chain) the process moves to step 1903 in which a received analog signal is transformed into the received encrypted data stream. Next, the process moves to step 1905 of decrypting the received encrypted data stream into a received decrypted data stream. In step 1907, a randomness inspection is conducted that includes step 1909 of accessing the received decrypted data stream and the received encrypted data stream and step 1911 of determining a randomness gain by comparing a first randomness measurement associated with the received decrypted data stream to a second randomness measurement associated with the received encrypted data stream. The process then ends at step 1930.

Figure 4:
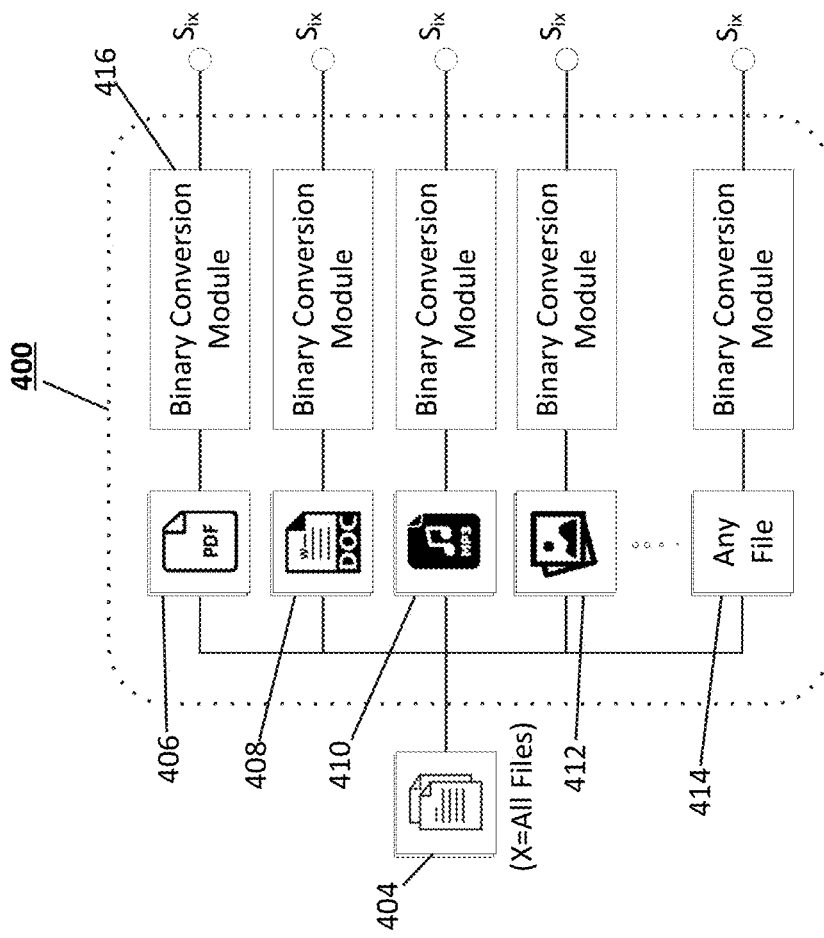
FIG. 4 is a diagram depicting an input data stream generator according to aspects of the invention.

FIG. 4 is a diagram of an input data stream generator 400 according to aspects of the invention. As seen in FIG. 4, there is input data files 404 which represent various types of files or data that can be used to create digital data streams. Such files/data may be, for example, a pdf file 406, a word processing document 408, a music file (e.g. MP3, etc.) 410, and image file 412, or any other type of file 414. Each type of file is processed by a binary conversion module 416 to provide a corresponding binary data stream $S_{ix}$ where i denotes that this is an input stream and x denotes the original file type i.e. pdf, word document, audio, image, or any other correlated data file or pseudorandom generated file. The data stream $S_{ix}$ can be, for example, the input data stream $S_{ix}$ of encryptor 204 of FIG. 2, or input data stream $S_{ix}$ of comparator 304 in randomness inspector 300 of FIG. 3.

Figure 5:
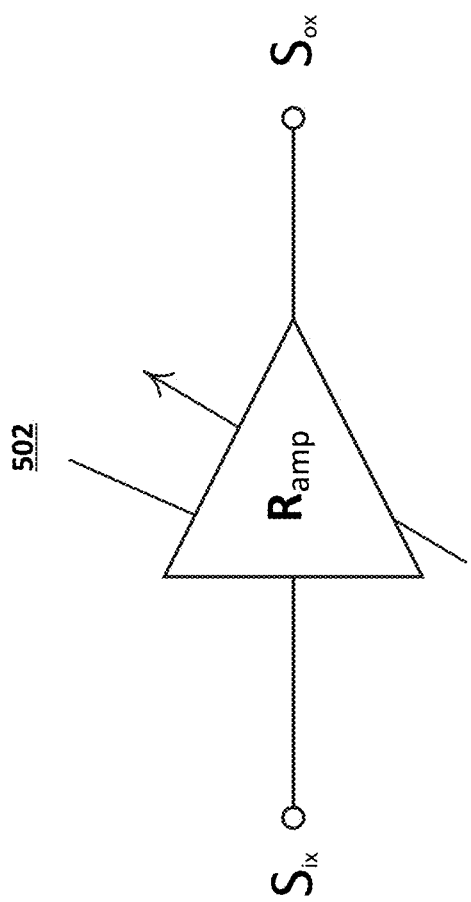
FIG. 5 is a top-level diagram of a randomness amplifier according to aspects of the invention.

FIG. 5 is a top-level diagram of a randomness amplifier according to aspects of the invention. Randomness amplifier 502 in FIG. 5 is a symbolic representation of an encryption testing system in which an input data stream $S_{ix}$ is provided to randomness amplifier 502 which applies an encryption method or technique thereby generating a randomness enhanced output data stream $S_{ox}$ and in which randomness amplifier 502 conducts a randomness comparison between the input data stream $S_{ix}$ and the output data stream $S_{ox}$ to obtain a randomness gain ($|R_{GAIN}|$) value (represented by the arrow in FIG. 5). The $|R_{GAIN}|$ value is a measure of the randomness applied by the encryption method or technique to the input data stream $S_{ix}$ to generate the output data stream $S_{ox}$.

The randomness amplifier 502 may be used to test component level cryptographic security of an encryption method, circuit, or scrambling system. In an aspect, randomness amplifier (Ramp) 502 is a representation of a system, device, or method that does encryption or scrambling of any form of digitized data at any communication layer of a network protocol stack, and determines an $|R_{GAIN}|$ value related to the encryption or scrambling. Randomness amplifier 502, therefore, takes an input digitized signal or data stream (such as data stream $S_{ix}$ generated by input data stream generator 400 of FIG. 4) as an input having a randomness value of $R_1$ and amplifies or enhances its randomness value by doing encryption or scrambling on the input data stream and produces a randomized output stream with a randomness value of $R_o$. The $|R_{GAIN}|$ value of a randomness amplifier defines the amount of randomness that is applied, by a Randomness Amplifier, of to an input data stream.

The encryption and/or scrambling methods used in randomness amplifier 502, could take various forms ("instances") in different methods and embodiments such as, but not limited to, an S-box, a mangling function, a rounds-logic and a key expansion module or any other information scrambling system at any layer of a network protocol stack. In each of these forms, the randomness amplifier takes an input stream and applies its encryption and/or scrambling method to produce a cipher stream by enhancing the randomness value of input stream by a measure defined as the randomness gain $|R_{GAIN}|$. The higher the value of $|R_{GAIN}|$ of a randomness amplifier, the more cryptographically strong cipher (encrypted output data stream) it can produce.

Figure 6:
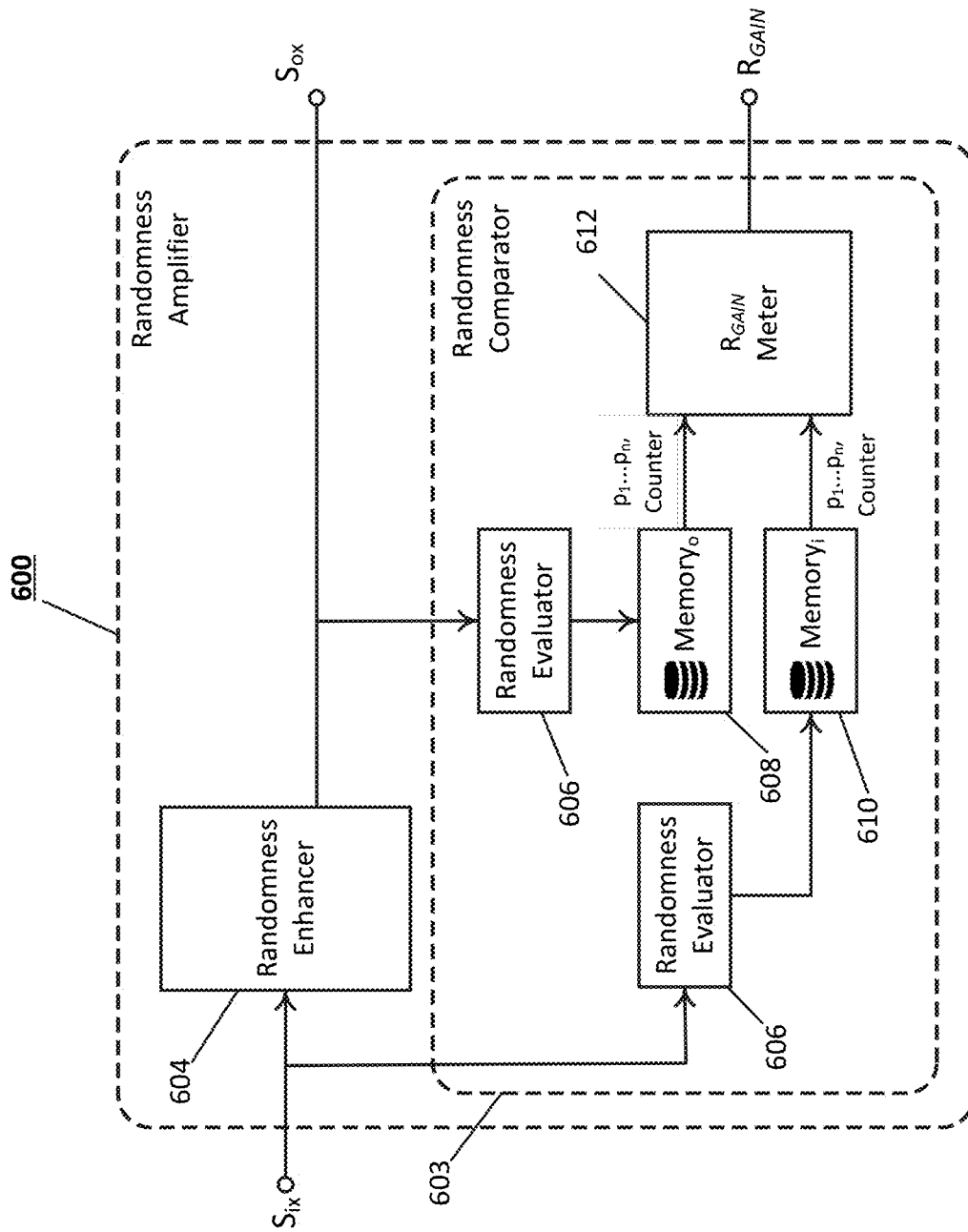
FIG. 6 is a functional diagram of a randomness amplifier according to aspects of the invention.

FIG. 6 is a functional block diagram of randomness amplifier 600 (such as randomness amplifier 502 of FIG. 5). As seen in FIG. 6, randomness amplifier 600 includes randomness enhancer 604 and randomness comparator 603. Randomness comparator 603 includes randomness evaluator

606 (two instances), memory 608, memory 610 and $R_{GAIN}$ meter 612. In an aspect, the randomness enhancer 604 takes an input digital data stream ($S_{ix}$) and encrypts it using an encryption method and produces a cipher output data stream ($S_{ox}$). The output of randomness enhancer 604 is given to a first instance of randomness evaluator 606, and the input data stream ($S_{ix}$) is also provided to a second instance of randomness evaluator 606. In an aspect, randomness evaluator 606 applies one or more different randomness test suites (like the NIST Test suite), or one or more component randomness tests thereof, and stores the results of the randomness tests (for example a p-value for each test) of the input stream ($S_{ix}$) in Memory$_i$ 610. Similarly, randomness evaluator 606 applies one or more different randomness test suites (like the NIST Test suite), or one or more component randomness tests thereof, and stores the results of the randomness tests (for example a p-value for each test) of the output stream ($S_{ox}$) in Memory$_o$ 608. In both instances, randomness evaluator 606 also stores a representation of a count of how many tests have failed into the respective memory. $R_{GAIN}$ meter 612 reads the randomness test results stored in Memory$_i$ 610 and Memory$_o$ 608 and computes a randomness gain ($R_{GAIN}$) applied by randomness enhancer 604.

Figure 20:
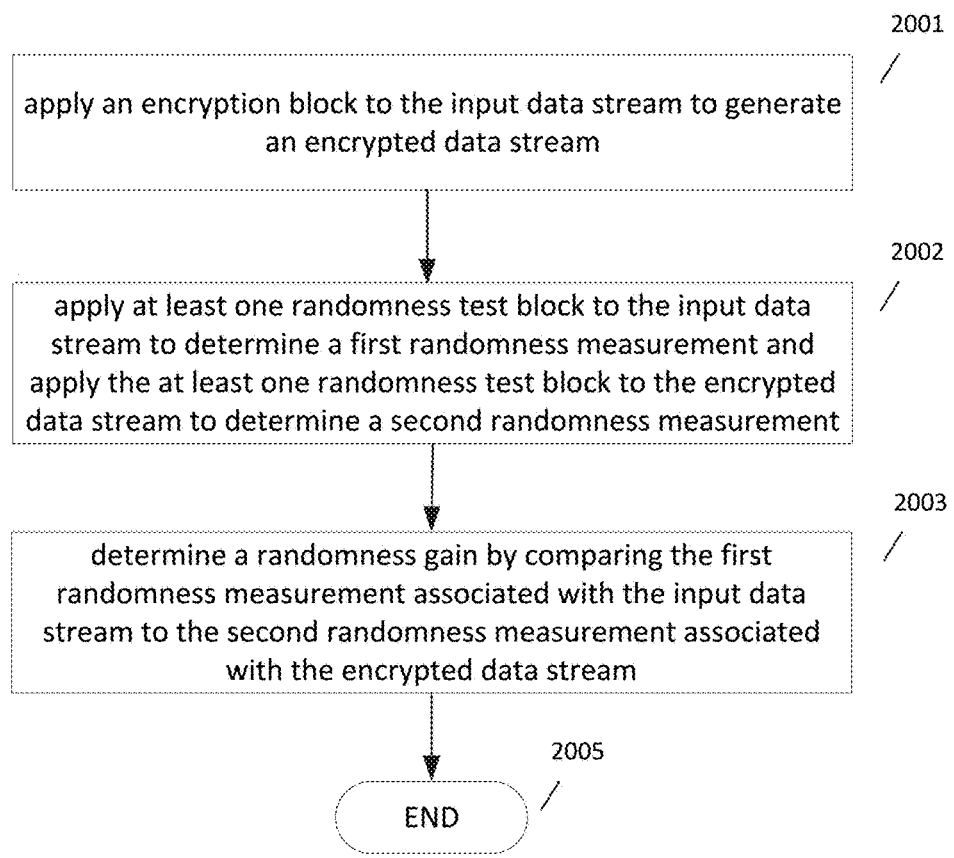
FIG. 20 is a flowchart depicting a process for a randomness amplifier according to aspects of the invention.

FIG. 20 is a flowchart depicting a process for a randomness amplifier according to an aspect. As seen in FIG. 20, the process begins at step 2001 in which an encryption block is applied to an input data stream to generate an encrypted data stream. In step 2002, at least one randomness evaluator applies at least one randomness test block to the input data stream to determine a first randomness measurement and applies the at least one randomness test block to the encrypted data stream to determine a second randomness measurement. In step 2003, a gain meter determines a randomness gain by comparing the first randomness measurement associated with the input data stream to the second randomness measurement associated with the encrypted data stream. The process then ends at step 2005.

Figure 22:
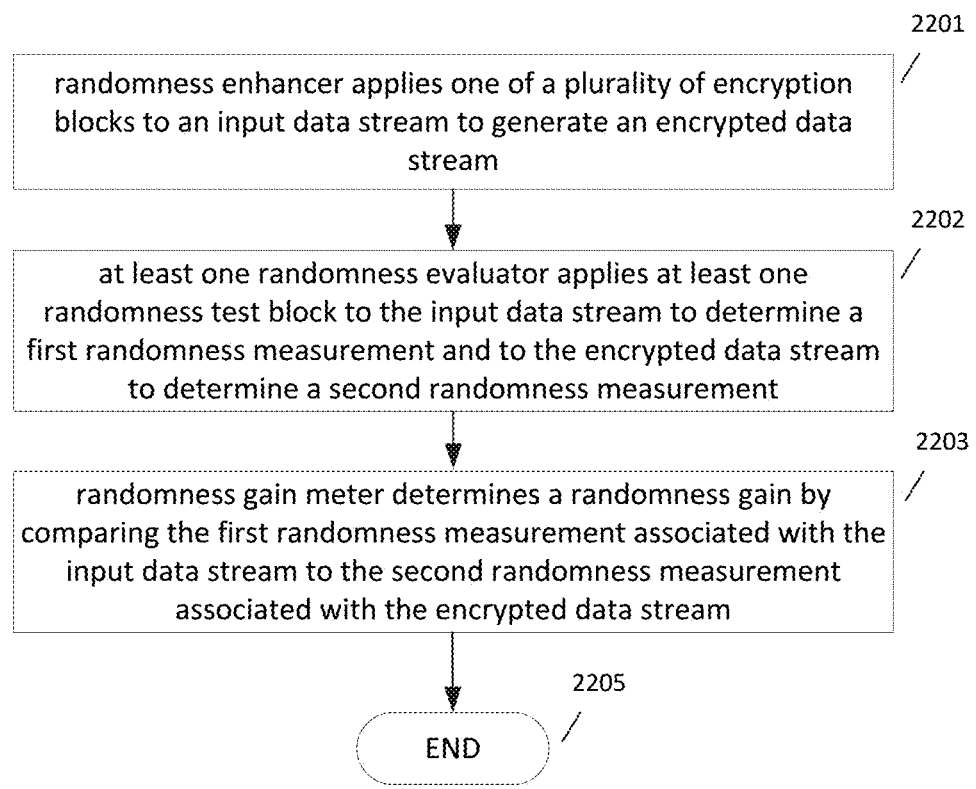
FIG. 22 is a flowchart depicting a process for a randomness amplifier with selectable inputs according to aspects of the invention.

FIG. 22 is a flowchart depicting a process for a randomness amplifier that can accept inputs for determining a randomness gain for data streams associated with any one of a plurality of encryption blocks (or decryption blocks) in a network stack according to an aspect. As seen in FIG. 22, the process begins at step 2201 in which a randomness enhancer (such as randomness enhancer 604 of FIG. 6) applies one of a plurality of encryption blocks to an input data stream to generate an encrypted data stream. As mentioned above, the applied encryption block can be, for example, any encryption block in a circuit (such as BBP 200 of FIG. 2) or a network stack. Next, in step 2202, at least one randomness evaluator applies at least one randomness test block to the input data stream to determine a first randomness measurement and also applies the at least one randomness test block to the encrypted data stream to determine a second randomness measurement. In step 2203, a randomness gain meter determines a randomness gain by comparing the first randomness measurement associated with the input data stream to the second randomness measurement associated with the encrypted data stream. The process then ends at step 2205.

Figure 23:
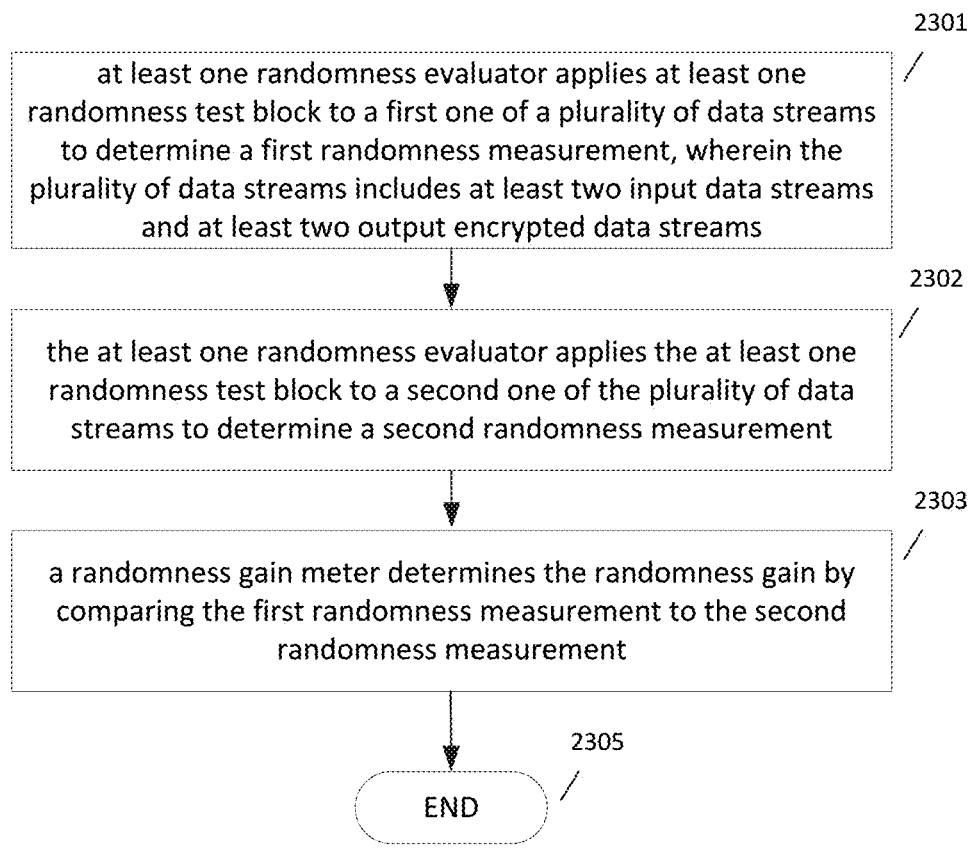
FIG. 23 is a flowchart depicting a process for a randomness comparator according to aspects of the invention.

FIG. 23 is a flowchart depicting a process for a randomness comparator that determines a randomness gain based on any two of a plurality of data streams according to an aspect. For example, the plurality of data streams can include at least two input data streams and at least two output encrypted data streams from any location in an encryption or scrambling circuit, such as for example in a baseband processor. As seen in FIG. 23, the process begins at step 2301 in which at least one randomness evaluator applies at least one randomness test block to a first one of the plurality of data streams to determine a first randomness measurement. In step 2302, the at least one randomness evaluator applies the at least one randomness test block to a second one of the plurality of data streams to determine a second randomness measurement. Next, in step 2303, a randomness gain meter that determines a randomness gain by comparing the first randomness measurement to the second randomness measurement. The process then ends at step 2305.

Figure 7:
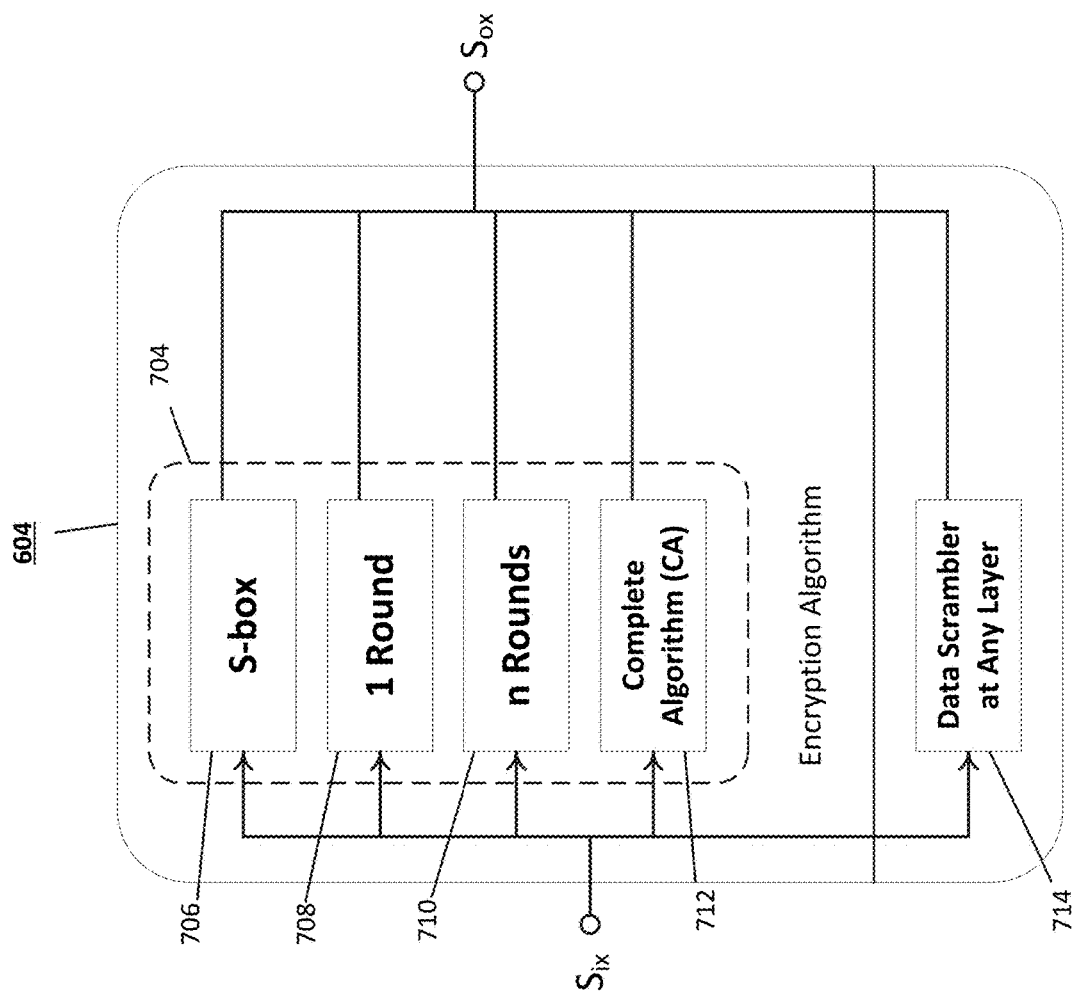
FIG. 7 is a functional diagram of a randomness enhancer according to aspects of the invention.

FIG. 7 is a functional block diagram of randomness enhancer 604 of FIG. 6. In FIG. 7, randomness enhancer 604 is shown to have the capability to include one or more types of encryption or scrambling methods which can be applied to an input data stream $S_{ix}$ at any granularity level on any communication layer of a network protocol stack, or at any stage or block of an encryption circuit. For example, if an instance of randomness enhancer 604 utilizes only the S-box 706 of an encryption method then the randomness gain in the generated output data stream $S_{ox}$ is representative of the strength of S-box 706. If instead an instance of randomness enhancer 604 utilizes a mangling function with a round logic around it, such as 1 Round 708 or n Rounds 710, then the randomness gain in the generated output data stream $S_{ox}$ is representative of the cryptographic strength of 1 Round 708 (or n Rounds 710) of an encryption method. Similarly, if an instance of randomness enhancer 604 utilizes a complete encryption method (CA) with the key scheduling module 712 then the randomness gain in the generated output data stream $S_{ox}$ is representative of the strength of the complete method (CA) 712. Another instance of randomness enhancer 604 may utilize data scrambler 714 at the physical layer. The randomness gain applied by data scrambler 714 is not only representative of its cryptographic strength but also benchmarks its strength against other known strong encryption methods such as like the Advanced Encryption Standard (AES). It should be appreciated that encryption components 706 to 714 of randomness enhancer 604 are examples, and that randomness enhancer 604 can include one or more components of any known encryption methods or techniques. Randomness enhancer 604 can also assign a sensitivity level to a particular instance of the type of encryption component(s) utilized that depicts the catastrophic level of information security compromise if it should fail one or more randomness tests in the NIST suite. For example, the lowest sensitivity level may be assigned to S-box 706 and the highest sensitivity level may be assigned to the complete encryption method (CA) 712. The penalty value ($T_{value}$) output by randomness evaluator 606 in FIG. 6 may be proportional to the assigned sensitivity level of the particular instance of randomness enhancer 604.

Figure 8:
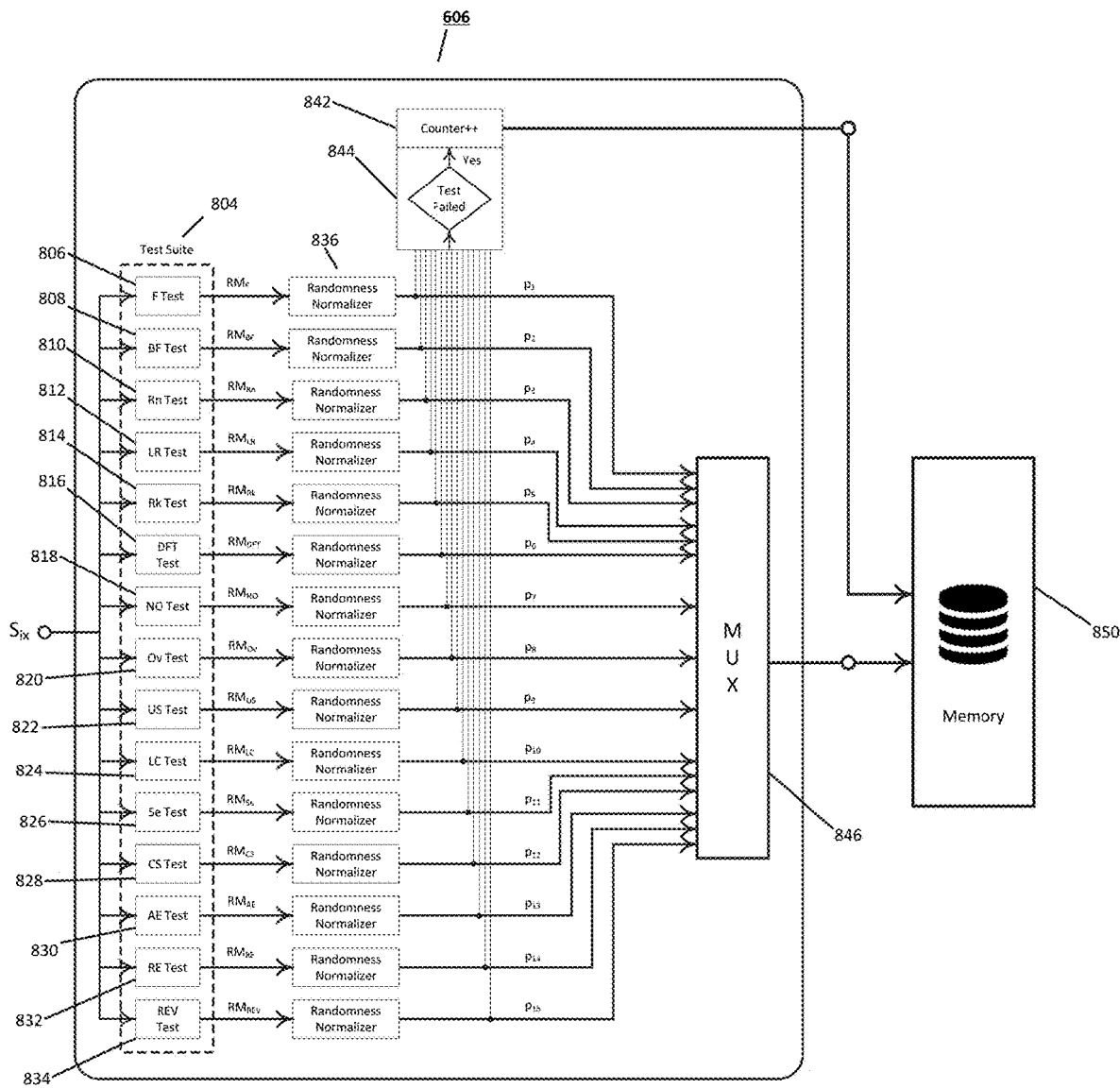
FIG. 8 is a functional diagram of a randomness evaluator according to aspects of the invention.

FIG. 8 shows a functional block diagram of randomness evaluator 606 of FIG. 6. As seen in FIG. 8, randomness evaluator 606 includes a randomness test suite 804 of various randomness tests 806 to 834, which may be similar to the proposed NIST test suite, or any other known randomness test suites, or components thereof. It should be appreciated that randomness test suite 804 can be generalized to any randomness test suite by extending or reducing the number of randomness tests contained therein. The generalized test suite can be enhanced by adding any new randomness test or any new randomness test suites. Moreover, randomness evaluator 606 could use any other known randomness test that is deemed useful in any applied instance of randomness evaluator 606. In randomness test suite 804, the NIST test suite is used as an example and is composed of 15 randomness test modules 806 to 834.

Randomness evaluator 606 applies each randomness test to input data stream $S_{ix}$ and computes a normalized statistical value (p-value) of each randomness test result on the basis of its corresponding randomness measure. In this example, the statistical p-value of a randomness test is used as the normalized statistical value. The p-value varies between 0.0 and 1.0 where 0.0 shows a perfectly correlated data stream and 1.0 shows a perfect pseudo random cipher stream. This calculation method is presented as an example only and it should be appreciated that randomness evaluator 606 could also use any known suitable normalized method to determine the randomness test result. A brief description of the 15 randomness tests of randomness test suite 804 is provided below.

1. Frequency Test (F) 806. The purpose of this test is to determine whether a randomness enhancer is able to ensure that the number of ones and zeros in the substituted cipher stream are approximately the same as would be expected in a random cipher. Its randomness measure is denoted by RMF. Its normalized statistical value is denoted by $p_1$.

2. Block Frequency Test (BF) 808. The aim of this test is to ensure that a randomness enhancer is able to maintain the notion of randomness—equal number of ones and zeros—even in small, substituted blocks of a given length M. Its randomness measure is denoted by $RM_B$. Its normalized statistical value is denoted by $p_2$.

3. Runs Test (Rn) 810. The purpose of this test is to determine whether a randomness enhancer is able to maintain the required oscillation speed between variable length k continuous ones and zeros. The test identifies whether the transitions between such zeros or ones is too slow or too fast. Its randomness measure is denoted by $RM_R$. Its normalized statistical value is denoted by $p_3$.

4. Longest Run of Ones in a Block Test (LR) 812. The purpose of this test is to determine whether a randomness enhancer is able to limit the longest run of ones within M block bits in such a fashion as expected in a random bit stream. Consequently, if the longest run of ones is irregular, the same would hold for zeros. Its randomness measure is denoted by $RM_L$. Its normalized statistical value is denoted by $p_4$.

5. Binary Matrix Rank Test (Rk) 814. The purpose of this test is to ensure that whether a randomness enhancer should not introduce a linear dependence among fixed length disjoint sub matrices of the entire cipher bit stream. Its randomness measure is denoted by $RM_K$. Its normalized statistical value is denoted by $p_5$.

6. Discrete Fourier Transform Test (DFT) 816. The purpose of this test is to identify whether a randomness enhancer has introduced periodic features in the cipher bit stream that would indicate a deviation from assumed randomness. The intention is to detect whether the number of peaks, in the Discrete Fourier Transform (DFT) of the cipher bit stream, exceeding the 95% threshold differs significantly by 5%. Its randomness measure is denoted by $RM_D$. Its normalized statistical value is denoted by $p_6$.

7. Non-Overlapping Test (NO) 818. The purpose of this test is to detect whether a randomness enhancer has generated too many occurrences of a given non-periodic patterns of an m-bit window. For p-value<0.01, it indicates that the cipher stream has irregular occurrences of the possible template patterns. Its randomness measure is denoted by $RM_N$. Its normalized statistical value is denoted by $p_7$.

8. Overlapping Test (Ov) 820. The purpose of this test is same as for NO test, but the difference is that in NO test, if the pattern is not found, the window slides one-bit position. But in this test, if the pattern is found, window slides on bit position before resuming the search. Its randomness measure is denoted by $RM_O$. Its normalized statistical value is denoted by $p_8$.

9. Universal Statistical Test (US) 822. The purpose of the test is to detect whether or not the cipher stream can be compressed without loss of information. A significantly compressible sequence is considered to be non-random. Its randomness measure is denoted by $RM_U$. Its normalized statistical value is denoted by $p_9$.

10. Linear Complexity Test (LC) 824. The purpose of this test is to determine randomness, introduced by a randomness enhancer, in the cipher stream by computing the length of Linear Feedback Shift Register (LFSR). Longer LFSR characterizes a random sequence. Its randomness measure is denoted by $RM_C$. Its normalized statistical value is denoted by $p_{10}$.

11. Serial Test (SE) 826. The purpose of this test is to determine whether the number of occurrences of the 2m m-bit overlapping patterns is approximately the same as would be expected for a random sequence. The random sequence is expected to have uniformity; all m-bit patterns have equal chances to appear in the cipher. Its randomness measure is denoted by $RM_T$. Its normalized statistical value is denoted by $p_{11}$.

12. Cumulative Sum Test (CS) 828. The purpose of this test to check whether the cumulative sum of partial sequences is too small or large. For a random sequence, the CS should be near zero. For nonrandom sequence, the CS will be large. Its randomness measure is denoted by $RM_S$. Its normalized statistical value is denoted by $p_{12}$.

13. Approximate Entropy Test (AE) 830. The purpose of this test is to determine whether a randomness enhancer has introduced overlapping m-bits patterns in the substituted cipher stream. A large frequency of consecutive m and m+1 length block represents a deviation from the notion of randomness. Its randomness measure is denoted by $RM_A$. Its normalized statistical value is denoted by $p_{13}$.

14. Random Excursion Test (RE) 832. The purpose of this test is to determine if the number of visits to a particular state within a cycle—consisting of a sequence of steps of unit length taken at random in such a fashion that one returns to the origin—deviates from what one would expect for a random sequence. In this test, (0,1) is transformed to (−1, +1) and then the number of visits to −4, −3, −2, −1, and +1, +2, +3 and +4 are calculated; as a result, we get 8 randomness measure values corresponding to each state. To simplify analysis, the module selects the minimum among them. Its randomness measure is denoted by $RM_E$. Its normalized statistical value is denoted by $p_{14}$.

15. Random Excursion Variant Test (REV) 834. The purpose of this test is to determine the number of times a particular state is visited in cumulative sum random walk and then conclude whether it deviates from the random walk. This test consists of a series of 18 tests and produces 18 randomness values. The module again picks up the minimum one among them to simplify the analysis. Its randomness measure is denoted by $RM_V$. Its normalized statistical value is denoted by $p_{15}$.

Randomness evaluator 606 also determines whether a randomness test has failed at decision block 844 and maintains a dynamic counter 842 that is initialized to zero for each data stream and is incremented by 1 whenever any individual randomness test of randomness test suite 804 fails. In this regard, if an entire encryption algorithm is currently being tested and the counter is non-zero it means that the entire encryption algorithm has failed at least one test of the randomness test suite and therefore the entire encryption algorithm is compromised or inadequate. Alternatively, if only a component of an entire encryption algorithm is being tested and the counter is non-zero it means that the encryption component currently being tested has failed at least one test of the randomness test suite, but it does not necessarily mean that the entire encryption algorithm is compromised or inadequate. In the latter case, further testing of the components of the entire encryption algorithm is necessary to determine whether the entire encryption algorithm is compromised or inadequate. Counter 842 outputs the counter value for subsequent use in a penalty function. Finally, the 15 normalized statistical values (p-values) and the counter 842 value corresponding to an input data stream $S_{ix}$ are stored through MUX 846 in Memory 850. Referring to FIG. 6, the normalized statistical values (p-values) and the counter value corresponding to an input data stream $S_{ix}$ given to randomness enhancer 604 are stored in memory 610, and the normalized statistical values (p-values) and the counter value corresponding to output data stream $S_{ox}$ of randomness enhancer 604 are stored in memory 608.

Figure 9:
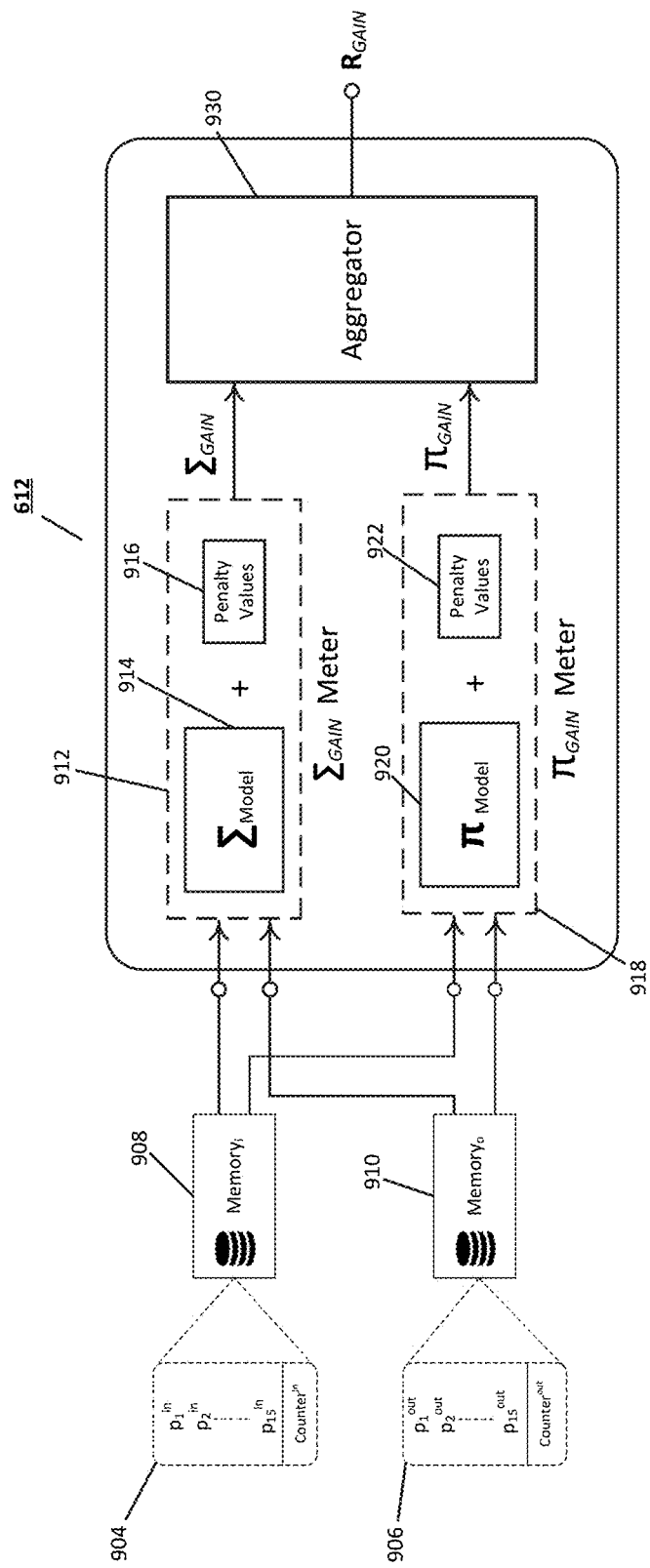
FIG. 9 is a functional diagram of a randomness gain meter according to aspects of the invention.

FIG. 9 is a functional block diagram of $R_{GAIN}$ Meter 612 of FIG. 6 in which. $R_{GAIN}$ meter 612 computes the $R_{GAIN}$ of randomness enhancer 604 where its input data stream is $S_{ix}$ and its cipher output data stream is $S_{ox}$.

As seen in FIG. 9, $R_{GAIN}$ meter 612 is composed of $\Sigma_{GAIN}$ meter 912, $\pi_{GAIN}$ meter 918 and aggregator module 930. Both meters 912 and 918 read the p-values and counter values 904 and 906 stored by randomness evaluator 606 both for input and output data streams in memories 908 and 910, respectively. $\Sigma_{GAIN}$ meter 912 includes $\Sigma_{Model}$ 914 and also a penalty value block 916 that applies a penalty function to the counter value to generate a penalty value ($T_{value}$) corresponding to the sensitivity level of the instance of randomness enhancer 604 and then finally computes $\Sigma_{GAIN}$ based on the output of $\Sigma_{Model}$ 914 and penalty value block 916. With regard to penalty value block 916, in case that an instance of randomness enhancer 604 utilizes S-box 706, it is highly likely that some tests of randomness test suite 804 might fail and therefore only a smaller penalty value $T_{value}$ is generated. On the other hand, in case that an instance of randomness enhancer 604 utilizes 1-round 708 or n rounds 710 of an encryption method and they still fail a randomness test, then a higher penalty value $T_{value}$ is generated because after n rounds an encryption method may not be expected to still fail any randomness test of randomness test suite 804. Both meters 912 and 918 take loge of determined randomness gain ($R_{GAIN}$) and then scale it by multiplying with k to result in scale values that provide better insights into randomness gain behavior of a randomness enhancer 604. In one instance, k is set to a value of 8 in order to provide differentiating behavior analyses. In other instances, k might take a value of 16 or 32 or any power of 2 that provides better insight into randomness gain behavior.

An example embodiment of $\Sigma_{Model}$ 914 is the following mathematical model, but it could generalize to be any other appropriate mathematical or heuristic model or method.

$$\Sigma_{MODEL} = k \times \log_2\left(\frac{1}{N}\sum_{j=1}^{N}\frac{p_j^{out}}{p_j^{in}+0.01}\right)$$

Penalty Value = $T_{value}$ $\Sigma_{GAIN} = \Sigma_{MODEL}$ + Penalty Value

-continued $$\Sigma_{GAIN} = k \times \log_2\left(\frac{1}{N}\sum_{j=1}^{N}\frac{p_j^{out}}{p_j^{in}+0.01}\right) + T_{value}$$

where N is the number of tests in randomness test suite 804, $p_j^{out}$ is the p-value of the test j applied on output data cipher stream produced by an instance of randomness enhancer 604 and $p_j^{in}$ is the p-value of the test j applied on an input data stream given to a randomness enhancer 604 and $T_{value}$ is a penalty value computed by penalty value block 916 by applying a penalty function of the form $[k\times\log_2(\lambda_p)\times counter]$ where counter 842 is the number of tests failed and $\lambda_p$ is chosen such that a penalty value proportional to the sensitivity level of randomness enhancer 604 is computed. In this regard, $\lambda_p$ is constrained to a value between 0 and 1, which results in the penalty value $T_{value}$ always being a negative value. $\Sigma_{GAIN}$ meter 912 adds 0.01 value to $p_j^{in}$ to avoid divide-by-zero exception and to cap the upper limit of scaled values where $p_j^{in}$ are very small. $\Sigma_{GAIN}$ computed by $\Sigma_{GAIN}$ meter 912 provides an upper limit on $R_{GAIN}$ (randomness gain) because it takes an arithmetic average of component gains of all test results of tests 806 to 834 of randomness test suite 804. Another example embodiment of $\Sigma_{Meter}$ 912 is:

$$\Sigma_{GAIN} = k \times \left(\frac{1}{N}\sum_{j=1}^{N}\frac{p_j^{out}}{p_j^{in}+0.01}\right) + T_{value}$$

Another example embodiment is:

$$\Sigma_{GAIN} = k \times \left(\frac{1}{N}\sum_{j=1}^{N} p_j^{out} - p_j^{in}\right) + T_{value}$$

$\pi_{GAIN}$ meter 918 uses a $\pi_{Model}$ 920 and penalty value block 922 (similar to penalty value block 916 described above) that applies a penalty function to the counter value to generate a penalty value ($T_{value}$) corresponding to the sensitivity level of the embodiment of randomness enhancer 604 in order to compute $\pi_{GAIN}$. An example embodiment of the $\pi_{Model}$ 920 is the following mathematical model, but it could generalize to any other appropriate mathematical or heuristic model or method.

$$\pi_{GAIN} = k \times \log_2\left[\prod_{j=1}^{N}\frac{p_j^{out}+0.1}{p_j^{in}+0.1}\right]^{\frac{1}{N}} + T_{value}$$

where N is the number of tests in randomness test suite 804, $p_j^{out}$ is the p-value of the test j applied on output data cipher stream produced by an instance of randomness enhancer 604, and $p_j^{in}$ is the p-value of the test j applied on input data stream given to an instance of randomness enhancer 604 and $T_{value}$ is a penalty value computed by penalty values block 922 by applying an appropriate penalty function of the form $[k\times\log_2(\lambda_p)\times counter]$ where counter 842 is the number of tests failed and $\lambda_p$ is chosen such that a penalty value proportional to the sensitivity level of randomness enhancer 604 is computed. In this regard, $\lambda_p$ is constrained to a value between 0 and 1, which results in the penalty value $T_{value}$ always being a negative value. $\pi_{GAIN}$ meter 918 adds 0.1 (or any small constant) to $p_j^{in}$ and $p_j^{out}$ to avoid divide-by-zero exception and to cap the upper limit of scaled values where $p_j^{in}$ are very small. $\pi_{GAIN}$ computed by $\pi_{GAIN}$ meter 918 provides a lower limit on $R_{GAIN}$ (randomness gain) because it takes a geometric average of component gains of the results of all randomness tests 806 to 834 of randomness test suite 804.

Another example embodiment of $\pi_{Model}$ 920 is:

$$\pi_{GAIN} = k \times \left[ \prod_{j=1}^{N} \frac{p_j^{out} + 0.1}{p_j^{in} + 0.1} \right]^{\frac{1}{N}} + T_{value}$$

Finally, aggregator 930 uses the definition of Arithmetic-Geometric mean (AGM) in one embodiment as an example to provide a representative randomness gain value between $\Sigma_{GAIN}$ and $\pi_{GAIN}$. The output value of $R_{GAIN}$ from aggregator 930 using the AGM method is:

$$R_{GAIN} = AGM(\Sigma_{GAIN}, \pi_{GAIN})$$

When $R_{GAIN}$ is computed on a logarithm 2 scale and measures the randomness gain ($R_{GAIN}$) of an instance of randomness enhancer 604 in units of Octa Bells (octaB) i.e. an increase of 8 octaB represents a twofold enhancement in randomness of a Randomness amplifier. In other embodiments, $\Sigma_{GAIN}$ and $\pi_{GAIN}$ can be aggregated using arithmetic mean, geometric mean, or any known suitable aggregation method.

Figure 10:
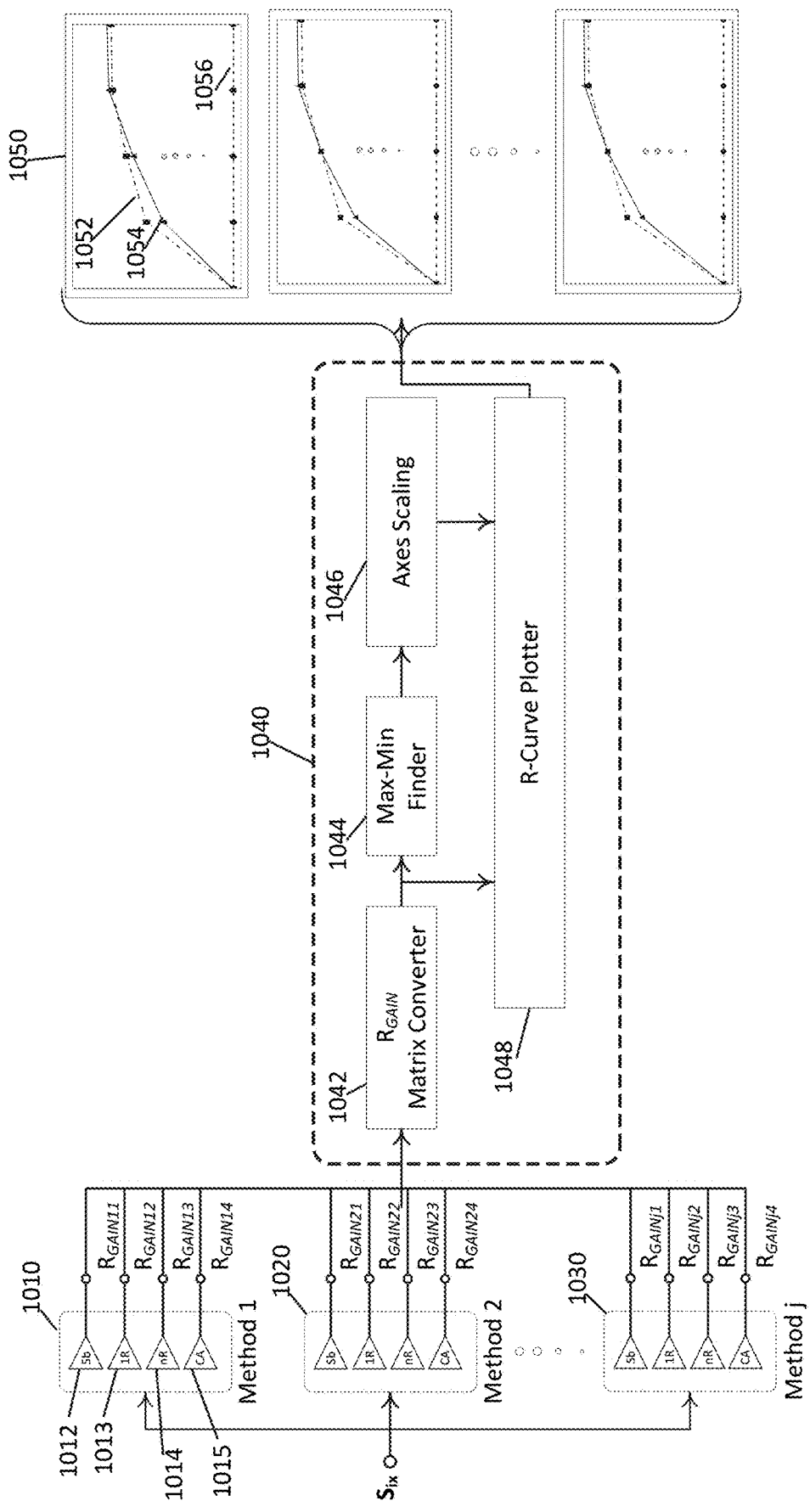
FIG. 10 is a functional diagram of a randomness gain plot generator according to aspects of the invention.

FIG. 10 is a functional block diagram of randomness scope 1040 that generates plots of $R_{GAIN}$ test results of randomness amplifier 600 test system of FIG. 6, for example. Randomness scope 1040 plots R-Curves for different instances (706 to 714) of randomness enhancer 604 which is comprised of an encryption method or its subcomponents. The testing of each encryption component of an encryption method is shown in FIG. 10 as randomness amplifiers 1012 to 1015, respectively, of Method 1 1010, which generate outputs $R_{GAIN11}$. $R_{GAIN12}$. $R_{GAIN13}$. And $R_{GAIN14}$. Testing of other Methods 2 to j are represented by other sets (1020, 1030) of randomness amplifiers with their associated output $R_{GAIN}$ values. Randomness scope 1040 includes $R_{GAIN}$ matrix convertor 1042 which creates a matrix of l*n*m dimension, where l shows the number of input data streams provided at the input of randomness amplifier 600, n shows the number of encryption methods to be compared and benchmarked, and m shows the number of granularity levels at which an instance of randomness enhancer 604 within randomness amplifier 600 test system is to be tested. The matrix elements for each input data stream is a 2-dimensional submatrix that stores randomness gain ($R_{GAIN}$) values for each instance (706 to 714) of randomness enhancer 604. Max-Min finder 1044 finds the maximum and minimum values of the randomness gains and provides them to Axes Scaling module 1046. R-curve plotter 1048 then generates R-Curve plots 1050 for each different encryption method by using linear splicing of randomness gains corresponding to each different encryption method (706 to 714). The plotted line 1052 of R-Curve 1050 shows the plot of the determined randomness gain ($R_{GAIN}$) corresponding to S-box 706, 1 Round 708, n Rounds 710, and Complete Method (CA) 712 of encryption method 1. Similarly, line 1054 of R-Curve 1050 shows the plot of the determined randomness gain ($R_{GAIN}$) corresponding to S-box 706, 1 Round 708, n Rounds 710, and Complete Method (CA) 712 of encryption method 2, etc.

Figure 11:
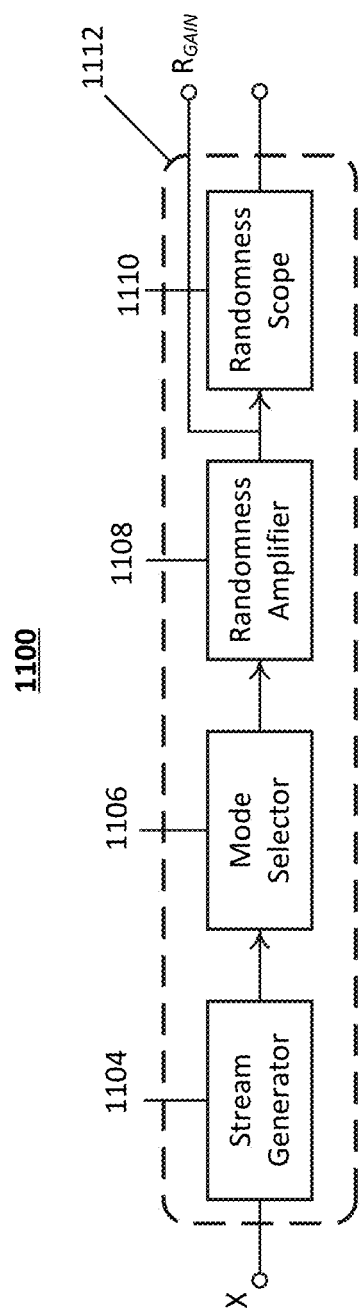
FIG. 11 is a functional diagram of a randomness analyzer system according to aspects of the invention.
Figure 12:
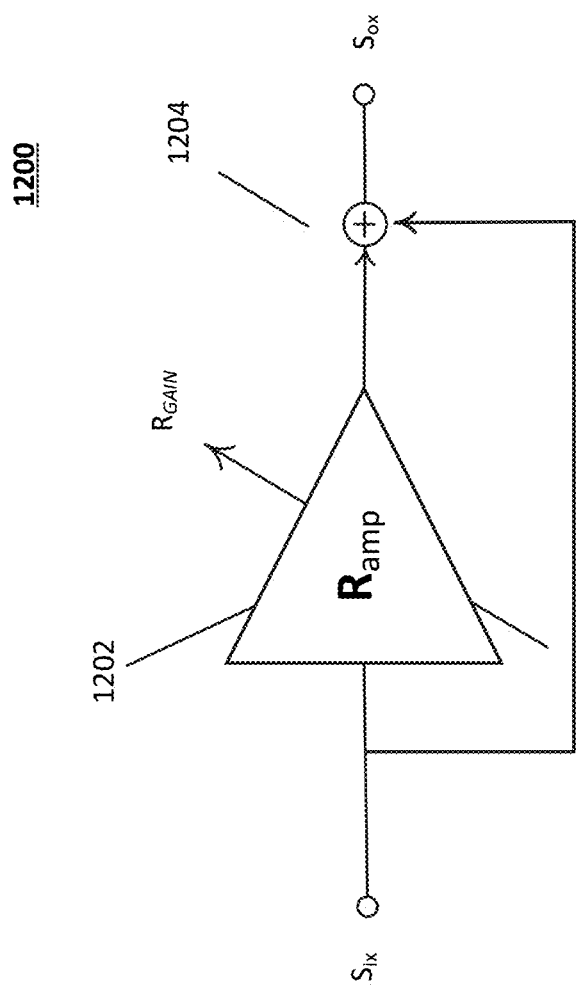
FIG. 12 is a top-level diagram of a randomness amplifier with correlated artifacts subtracted from the output stream according to aspects of the invention.

FIG. 11 is a functional block diagram of a randomness test system (RTS) 1100 for end-to-end testing of encryption methods comprised of different encryption components and determining $R_{GAIN}$ values for the components and outputting plots of the test results. RTS 1100 includes stream generator 1104, mode selector 1106, randomness amplifier 1108 and randomness scope 1110. Stream generator 1104 generates input digital data streams in a manner as described above with respect to FIG. 4 and its associated description. Randomness amplifier 1108 applies randomness to the input digital data stream and tests the output data stream to determine a randomness gain in a manner as described above with respect to FIGS. 6 to 9 and their associated description. Randomness scope 1110 generates plots of the randomness gain test results in a manner as described above with respect to FIG. 10 and its associated description. RTS 1100 provides the ability to conduct randomness testing in different operational modes by utilizing mode selector 1106. Example embodiments of two operational modes are provided in FIG. 5 (correlated randomness amplifier—CRA mode) and in FIG. 12 (uncorrelated randomness amplifier—URA mode). Turning to FIG. 5, an $R_{GAIN}$ meter (such as $R_{GAIN}$ meter 612) of randomness amplifier 502 (CRA mode) computes its randomness gain ($R_{GAIN}$) based on results from a randomness evaluator (such as randomness evaluator 606) of randomness amplifier 502 by application of randomness test suite 804 on its output cipher data stream ($S_{ox}$) and input data stream ($S_{ix}$). Randomness amplifier 502 (CRA mode) provides a lower limit on the randomness gain for a correlated input data stream because correlated artifacts of the input data stream are not subtracted from the output cipher stream. Turning to FIG. 12, randomness amplifier (URA mode) 1202 shows that the correlated artifacts of the input data stream are subtracted from the output data stream at junction 1204. As a result, the correlated artifacts of the input data stream are suppressed and so the cipher output data stream ($S_{ox}$) now contains only pseudo randomness data stream. This URA mode provides an upper limit on the randomness gain. An $R_{GAIN}$ meter (such as $R_{GAIN}$ meter 612) of URA randomness amplifier 1202 computes a randomness gain ($R_{GAIN}$) based on results from a randomness evaluator (such as randomness evaluator 606) of randomness amplifier 1202 by application of randomness test suite 804 on its cipher output data stream ($S_{ox}$) and input data stream ($S_{ix}$).

RTS 1100 empowers users and designers of encryption methods to test components of encryption methods by treating components of an encryption method as an instance of a randomness enhancer in randomness amplifier 1108 and testing their cryptographic strength by computing an associated randomness gain ($R_{GAIN}$). This unique and novel testing process is referred to herein as Deep Cipher Investigation (DCI).

Figure 13:
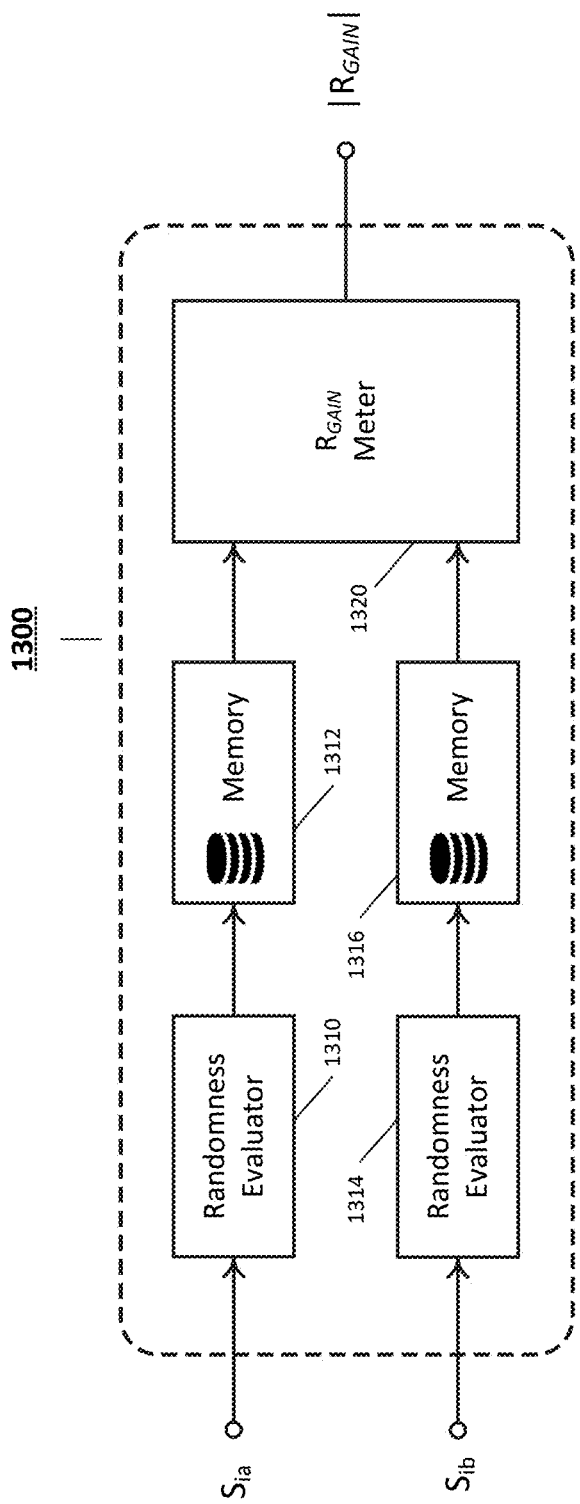
FIG. 13 is a functional diagram of a randomness comparator according to aspects of the invention.

In another aspect of the invention, FIG. 13 shows a randomness comparator 1300 that is a simplified version of randomness comparator 603 of randomness amplifier 600 shown in FIG. 6. In FIG. 13, randomness comparator 1300 has two input data streams $S_{ia}$ and $S_{ib}$, respectively and provides them to randomness evaluators 1310 and 1314, respectively. The functionality of randomness evaluators 1310 and 1314 is the same as that described above with respect to randomness evaluator 606 of FIGS. 6 and 8. In randomness comparator 1300, once $R_{GAIN}$ meter 1320 computes the randomness gain ($R_{GAIN}$) by considering one of the streams as an input stream and the other as an output stream, then due to logarithm scale, it is actually computing the randomness distance which effectively models the difference in their randomness values. Finally, $R_{GAIN}$ meter 1320 takes the modulus to show randomness distance measure between the two streams. Accordingly, randomness comparator 1300 makes it possible to measure the closeness of two streams in the randomness space. The smaller the randomness distance, the closer are two streams in the randomness space and vice versa.

Figure 14:
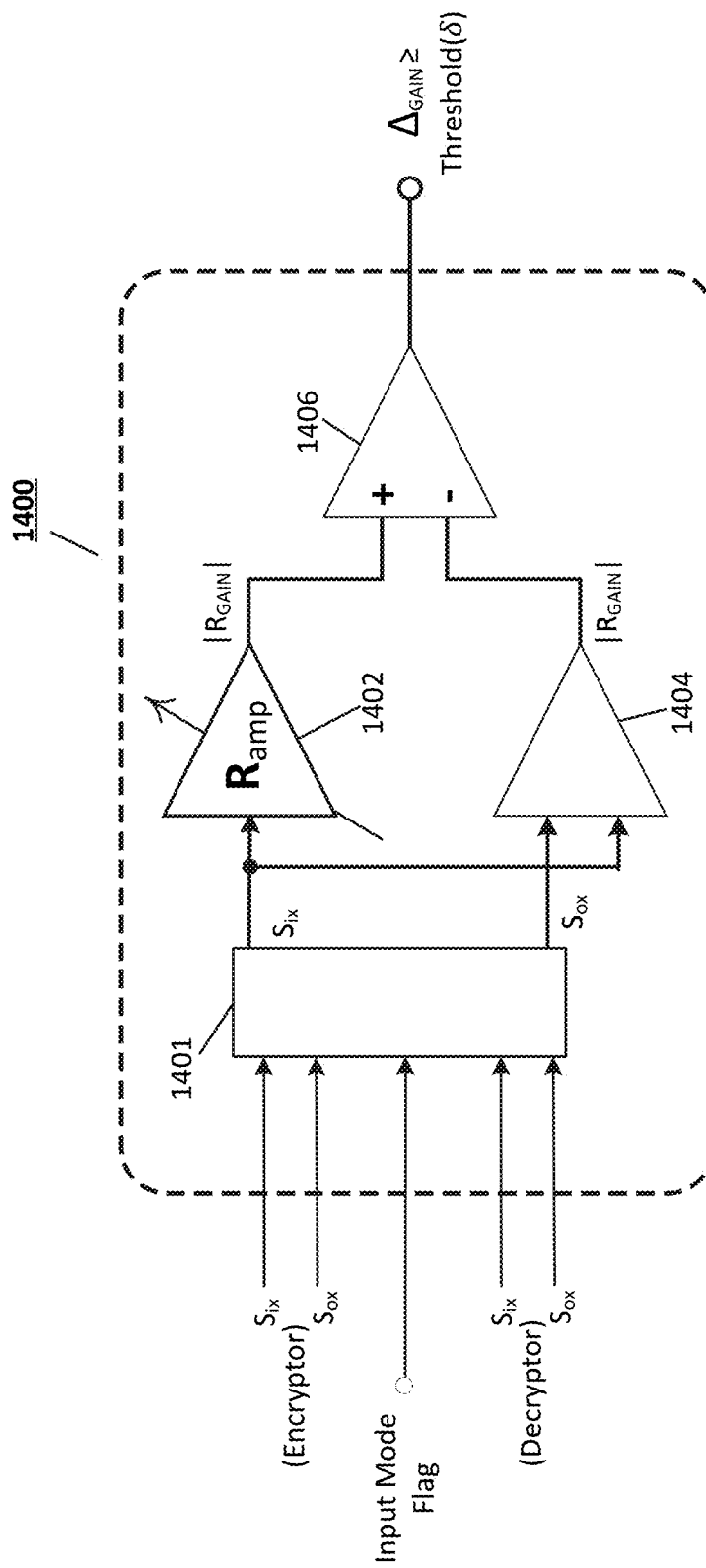
FIG. 14 is a functional diagram of a benchmarked randomness inspector according to aspects of the invention.

In another aspect, FIG. 14 is a block diagram of randomness inspector 1400 which benchmarks the $R_{GAIN}$ of an instance of a randomness comparator 1404 against a standard randomness amplifier 1402, such as an AES model instance of a randomness amplifier. Randomness inspector 1400 uses difference calculator 1406 to benchmark the output $R_{GAIN}$ of the randomness comparator 1404, which may be coupled to an encryptor block in a BPP for example, against the output $R_{GAIN}$ of the AES model amplifier 1402. Randomness inspector 1400 selects from two sets of inputs (for example, inputs from either a transmit chain or a receive chain of a BPP). In FIG. 14, two data streams $S_{ix}$ and $S_{ox}$ from an encryptor block and two data streams $S_{ix}$ and $S_{ox}$ from a decryptor block are provided to switch 1401. Similar to switch 302 of FIG. 3, switch 1401 can be located in Randomness Inspector 1400 or can be located outside of Randomness Inspector 1400, such as in a separate component or function of a circuit in which Randomness Inspector 1400 resides, such as for example in BBP 200 shown in FIG. 2. Switch 1401 can be implemented in a circuit, logic, or other known means. Alternatively, switch 1401 may be optional in the case that Randomness Inspector 1400 is configured to only accept inputs from an encryptor block (such as in the transmit chain of BBP 200) or to only accept inputs from a decryptor block (such as in the receive chain of BBP 200). An Input Mode Flag is also provided to switch 1401 which instructs switch 1401 whether to use the data streams $S_{ix}$ and $S_{ox}$ from the encryptor block or from the decryptor block and then output them as selected data streams $S_{ix}$ and $S_{ox}$ to randomness comparator 1404 and AES model amplifier 1402. If the difference ($\Delta$) determined by difference calculator 1406 between the randomness gains of the two randomness amplifiers (the first amplifier being randomness comparator 1404 coupled to an encryptor, and the second amplifier being the AES model amplifier) is more than a threshold ($\delta$), then it is determined that the encryptor associated with randomness comparator 1404 is either disabled or severely compromised. In such a state of disablement or compromise, a system controller could be enabled to take appropriate steps to mitigate the adverse effects of this type of security problem with the compromised encryptor.

Figure 21:
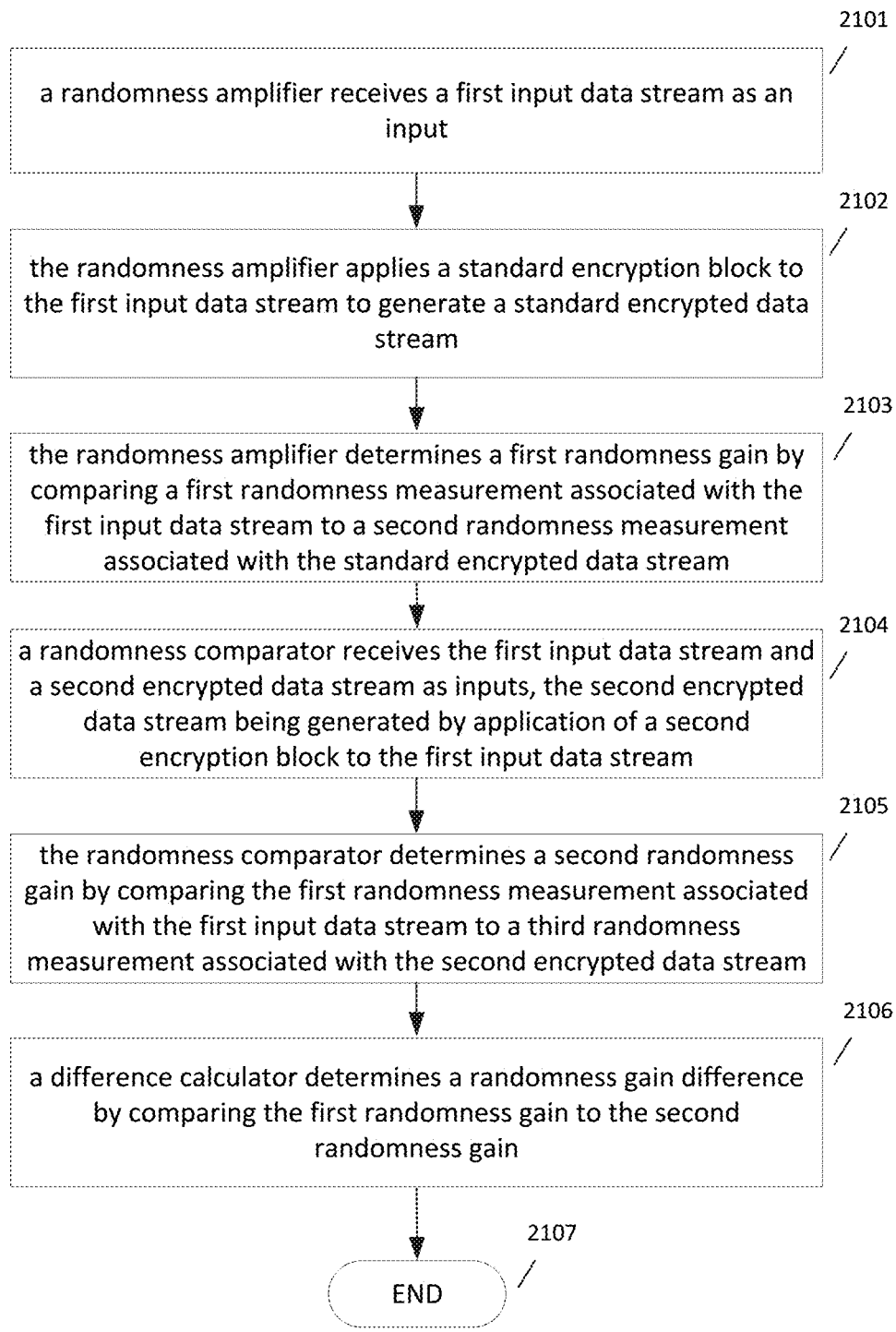
FIG. 21 is a flowchart depicting a process for a benchmarked randomness inspection of at least one data stream in a circuit according to aspects of the invention.

FIG. 21 is a flowchart depicting a process for a benchmarked randomness amplifier according to an aspect. As seen in FIG. 21, the process begins at step 2101 in which a randomness amplifier receives a first input data stream as an input. Next, in step 2102, the randomness amplifier applies a standard encryption block to the first input data stream to generate a standard encrypted data stream. In step 2103, the randomness amplifier determines a first randomness gain by comparing a first randomness measurement associated with the first input data stream to a second randomness measurement associated with the standard encrypted data stream. The process then moves to step 2104 in which a randomness comparator receives the first input data stream and a second encrypted data stream as inputs, the second encrypted data stream being generated by application of a second encryption block to the first input data stream. In step 2105, the randomness comparator determines a second randomness gain by comparing the first randomness measurement associated with the first input data stream to a third randomness measurement associated with the second encrypted data stream. In step 2106, a difference calculator determines a randomness gain difference by comparing the first randomness gain to the second randomness gain. The process then ends at step 2107.

Figure 15:
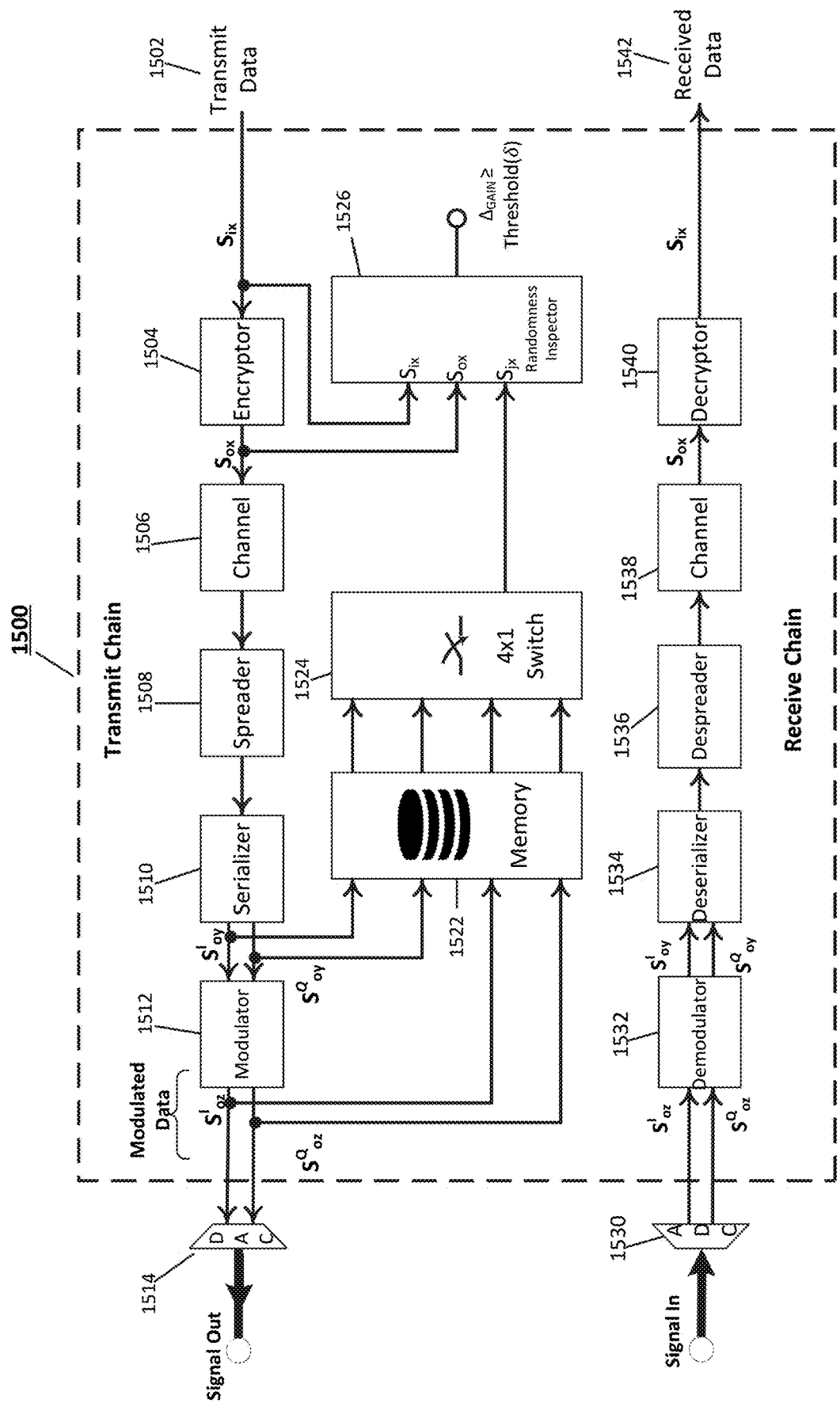
FIG. 15 is a functional diagram depicting a baseband processor with a randomness inspector having switchable inputs according to aspects of the invention.

FIG. 15 depicts a block diagram of a baseband processor (BBP) 1500 suitable for different types of radios and FOC systems, wherein the BBP includes a randomness inspector 1526 having switchable inputs according to an aspect of the invention. BBP 1500 is similar to BBP 200 of FIG. 2, except that randomness inspector 1526 of BBP 1500 has the capability to switch inputs in order to test the encryption strength of different blocks in the chain of BBP 1500. BBP 1500 includes, but is not limited to, encryptor 1504, channel selection 1506, spreader 1508, serializer 1510, and modulator 1512 in the transmit chain. As seen in FIG. 15, transmit data 1502 is input into BBP 1500 and is processed by blocks 1504 to 1512 to output modulated data to DAC 1514 to create an analog output signal. The receiver chain includes demodulator 1532, deserializer 1534, despreader 1536, channel selection 1538 and decryptor 1540. In the receiver chain of FIG. 15, an analog signal-in is input to ADC 1530 which outputs modulated data to BBP 1500 which processes it in blocks 1532 to 1540 to generate decrypted received data 1542.

According to an aspect of the invention, randomness inspector 1526 computes the randomness distance of any two serial or parallel data bit data streams at any time and at various locations in BPP 1500 to find out whether the encryption method has been compromised or disabled, such as by an adversary attack on the channel. In case of a security breach, BPP 1500 can alert the system to take appropriate security mitigation countermeasures. Randomness inspector 1526 can be implemented using existing resources in BPP 1500 or in a dedicated hardware and can be realized within the baseband processor chip or a separate dedicated chip.

As seen in FIG. 15, the data stream for investigation can be the tapped from the input or output of blocks 1504, 1510 or 1512 to determine a problem or compromise in the encryption provided by that particular block (the location), and the severity and the type of an adversary attack. An encryption investigation can be applied on the whole band, a sub-band, a complete channel of the sub channels of the TDMA and FDMA, CDMA or spread spectrum systems.

In the case that the gNB or the UE is under attack and the cryptographic strength of an encryption method is compromised or the encryption module is bypassed, such an attack can be detected by connecting the input $S_{ix}$ and output $S_{ox}$ of encryptor 1504 to the two of the inputs $S_{ix}$ and $S_{ox}$ of randomness inspector 1526, respectively. The $S_{ix}$ input of randomness inspector 1526 may be tied to the data stream which is under investigation though memory 1522 and switch 1524. As discussed above, $|R_{GAIN}|$ values computed inside the randomness inspector 1526 determine the randomness distance between input and output data streams. The determined $|R_{GAIN}|$ and both the input $S_{ix}$ and the output $S_{ox}$ can be used directly or stored in memory 1522 for a later use.

Figure 16:
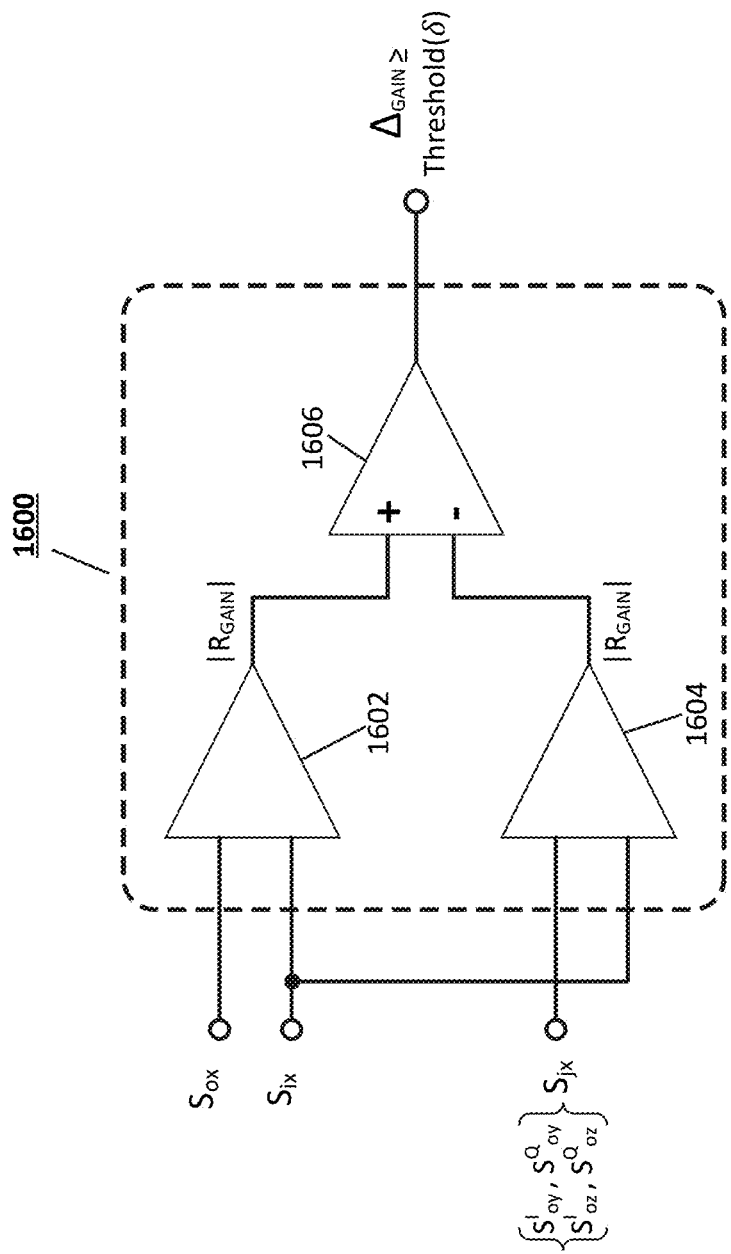
FIG. 16 is a functional diagram of a randomness inspector with switchable inputs according to aspects of the invention.

FIG. 16 depicts a functional block diagram of randomness inspector 1600, such as randomness inspector 1526 of FIG. 15, having switchable inputs. The switchable inputs can be from, for example, any block in the transmit chain or any block in the receive chain of BPP 1500 shown in FIG. 15 (or BBP 200 of FIG. 2). Randomness inspector 1600 includes two randomness comparators 1602 and 1604 and a difference calculator 1606 which calculates the difference (Δ) in the $|R_{GAIN}|$ determined by each of the randomness comparators 1602 and 1604. If the difference (Δ) in the two $|R_{GAIN}|$ values is less than a predetermined threshold (δ), it is determined that the two data streams are very close in randomness space. In FIG. 16, randomness comparator 1602 has inputs $S_{ix}$ which is an input data stream before encryption and $S_{ox}$ which is an output data stream after encryption. Randomness comparator 1602 determines the randomness gain $|R_{GAIN}|$ between the $S_{ix}$ and $S_{ox}$ data streams which is an indication of the strength of the encryption applied to $S_{ix}$ to thereby result in $S_{ox}$. Randomness comparator 1604 has inputs $S_{ix}$ which is the input data stream before encryption and $S_{ix}$ which is a data stream after a subsequent level of encryption at another block location in an encryption circuit, such as BPP 1500. Randomness comparator 1604 determines the randomness gain $|R_{GAIN}|$ between $S_{ix}$ and $S_{ix}$ which is an indication of the strength of the subsequent level of encryption applied to thereby result in $S_{ix}$. As seen in FIG. 16, data stream $S_{ix}$ may be selected, such as by a switch, from a variety of data streams in an encryption chain or circuit such as, for example, data streams $S^I_{oy}$, $S^Q_{oy}$, $S^I_{oz}$, and $S^Q_{oz}$, which represent output data streams from different locations in an encryption chain or circuit. In an aspect, randomness comparators 1602 and 1604 determine the randomness gain $|R_{GAIN}|$ by applying a randomness evaluator to each of the input data streams to the comparator as described above with respect to randomness evaluator 606 in FIGS. 6 and 8.

Returning to FIG. 15, if encryptor 1504 is enabled, then $|R_{GAIN}|$ of randomness comparator 1602 inside the randomness inspector 1526 should correspond to a high randomness distance between the two data streams; otherwise, encryptor 1504 degrades to ILLUZIJA (a fake encryptor) and such a compromise is easily detected by randomness inspector 1526. An undetected ILLUZIJA attack could significantly reduce the cryptographic strength of cipher output data stream $S_{ox}$ and therefore lead to a security breach of the information in output data stream $S_{ox}$.

If encryptor 1504 is not disabled, there is still a possibility that serializer 1510 or modulator 1512 might have been the target of an attack to degrade the cryptographic strength of cipher output stream $S_{ox}$. In order to detect that blocks 1510 or 1512 are under attack, any suspected compromised data stream from the I or Q channel before or after modulation ($S^I_{oy}$, $S^Q_{oy}$, $S^I_{oz}$, and $S^Q_{oz}$) is fed to the $S_{ix}$ input of the randomness inspector 1526 along with the input data stream $S_{ix}$ and the output data stream $S_{ox}$ of encryptor 1504 to their respective inputs $S_{ix}$ and $S_{ox}$ of randomness inspector 1526. The output of randomness inspector 1526 is a randomness distance measure (Δ) between the reference stream ($S_{ix}$) and the data stream $S_{ix}$ under investigation ($S^I_{oy}$, $S^Q_{oy}$, $S^I_{oz}$, $S^Q_{oz}$). If the difference (Δ) between the two data streams is more than a threshold (δ), then it is determined that the block in the system under investigation is has been compromised. In such a compromised situation, the system controller may be enabled to take the appropriate steps to mitigate the adverse effects of the detected type of security attack or compromise.

According to certain above-described aspects and the accompanying figures, a randomness inspector is provided in an encryption circuit, such as a BPP for example, which can test data streams at different locations in the circuit to determine the encryption strength of one or more components of the encryption circuit, and also to thereby determine if one or more of the components is disabled or compromised.

Figure 17:
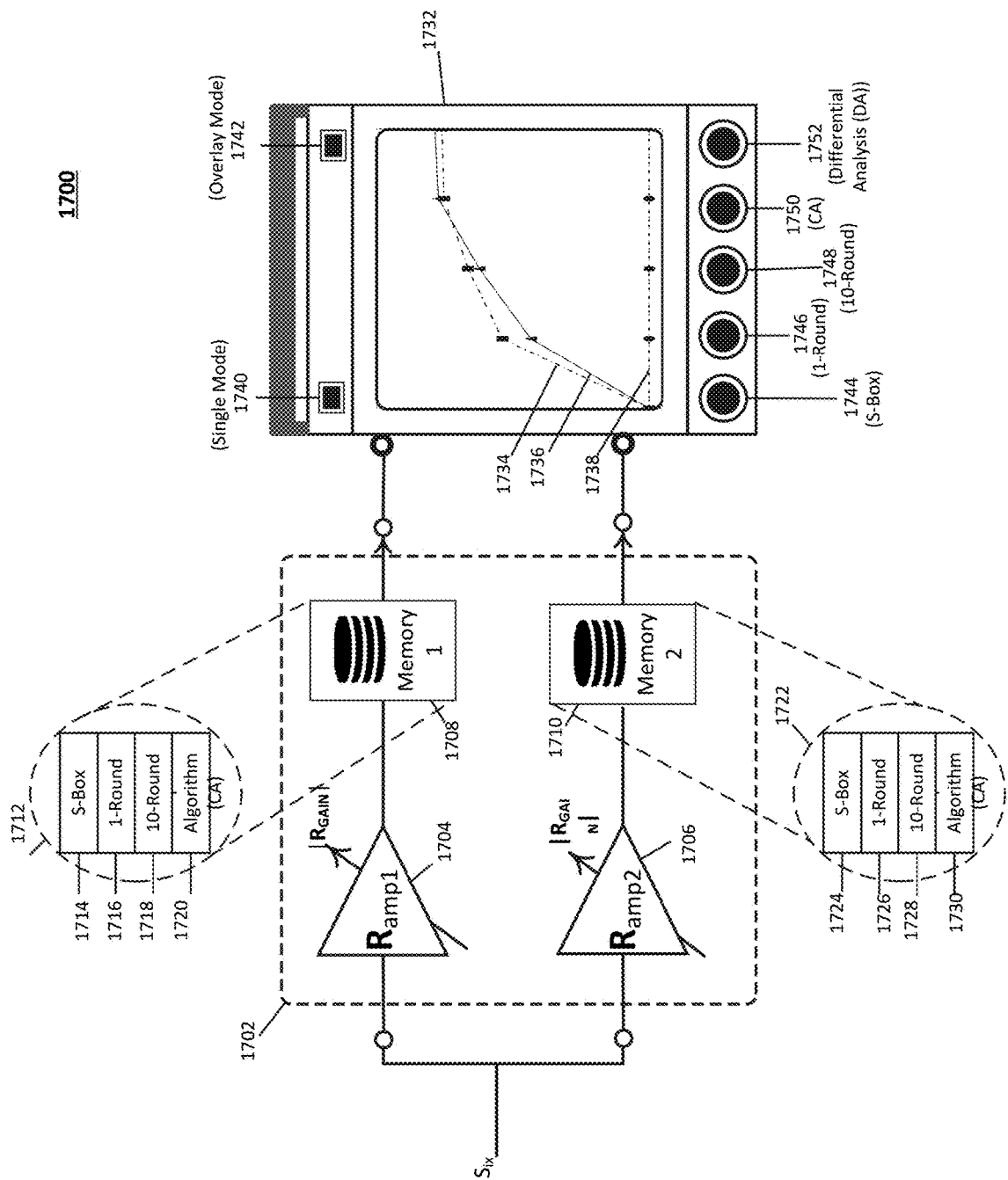
FIG. 17 is a is a top-level diagram of a differential randomness comparator with two randomness amplifiers according to aspects of the invention.

In another aspect, FIG. 17 is a block diagram of differential randomness comparator 1702 which benchmarks the $R_{GAIN}$ of an instance of one standard randomness amplifier 1704, such as an AES model, a MARS model (a known shared-key (symmetric) block cipher), or other known standard encryption or scrambling model instance of a randomness amplifier, against a second randomness amplifier 1706, such as a selectable or programmable encryption model instance of a randomness amplifier, thereby determining whether a pattern of differential behavior exists between standard randomness amplifier 1704 and selected/programmed randomness amplifier 1706, and also to thereby determine whether differential attacks are possible on either of randomness amplifiers 1704 and 1706. In this manner, selected/programmed randomness amplifier 1706 (which may apply an encryption model or algorithm under investigation or analysis) can be benchmarked against standard randomness amplifier 1704. Differential randomness comparator 1702 stores $R_{GAIN}$ values of S-box 1714, 1 Round 1716, n Rounds 1718 and Complete Method 1720 variants of Randomness Amplifier 1704 in Memory 1708, and similarly, Differential randomness comparator 1702 stores $R_{GAIN}$ values of S-box 1724, 1 Round 1726, n Rounds 1728 and Complete Method 1730 variants of Randomness Amplifier 1706 in Memory 1710. An apparatus Randomness Scope 1732 reads the plurality of randomness gain values of the different variants of the two compared randomness amplifiers from Memories 1708 and 1710, respectively, and then plots R-Curves (1734, 1736 and 1738) of the two benchmarked randomness amplifiers and ILLUIZJA (a fake encryptor) on its randomness distance screen (with a logarithm display). A designer or analyst of an encryption circuit can select between Single Mode 1740 and Overlay Mode 1742 to choose between seeing the R-Curve of only one randomness amplifier or a plurality of more than one R-Curves, respectively. The designer or analyst of an encryption circuit or system or method can also choose to benchmark S-box only, 1 Round only, n Rounds only or Complete Method variants of two randomness amplifiers by pressing S-box button 1744, 1 Round button 1746, n Rounds button 1748 or Complete Algorithm button 1750, respectively. If the randomness gain difference (Δ) between the randomness gains of the two randomness amplifiers (for example, the first amplifier 1704 being coupled to an encryptor, and the second amplifier 1706 being coupled to an encryptor) is more than a threshold (δ), then it is determined that one or more of the encryptor circuits or systems or algorithms are in a compromised state and may be vulnerable and susceptible to differential attacks that eventually may be exploited by adversaries. R-Curves 1734, 1736 and 1738 represent the results of three different randomness amplifiers, respectively, where 1738 is an R-Curve of ILLUZIJA. R-Curves 1734 and 1736 on Randomness Scope 1732 show that both randomness amplifiers 1704 and 1706 are vulnerable to differential analysis attacks once their randomness gains are analyzed using this unique and novel process of Deep Cipher Investigation (DCI). In such a state of compromise, encryption circuit designers could be enabled to take appropriate steps to mitigate the adverse effects of this type of security problem with the encryptor associated with each compromised randomness amplifier.

Figure 24:
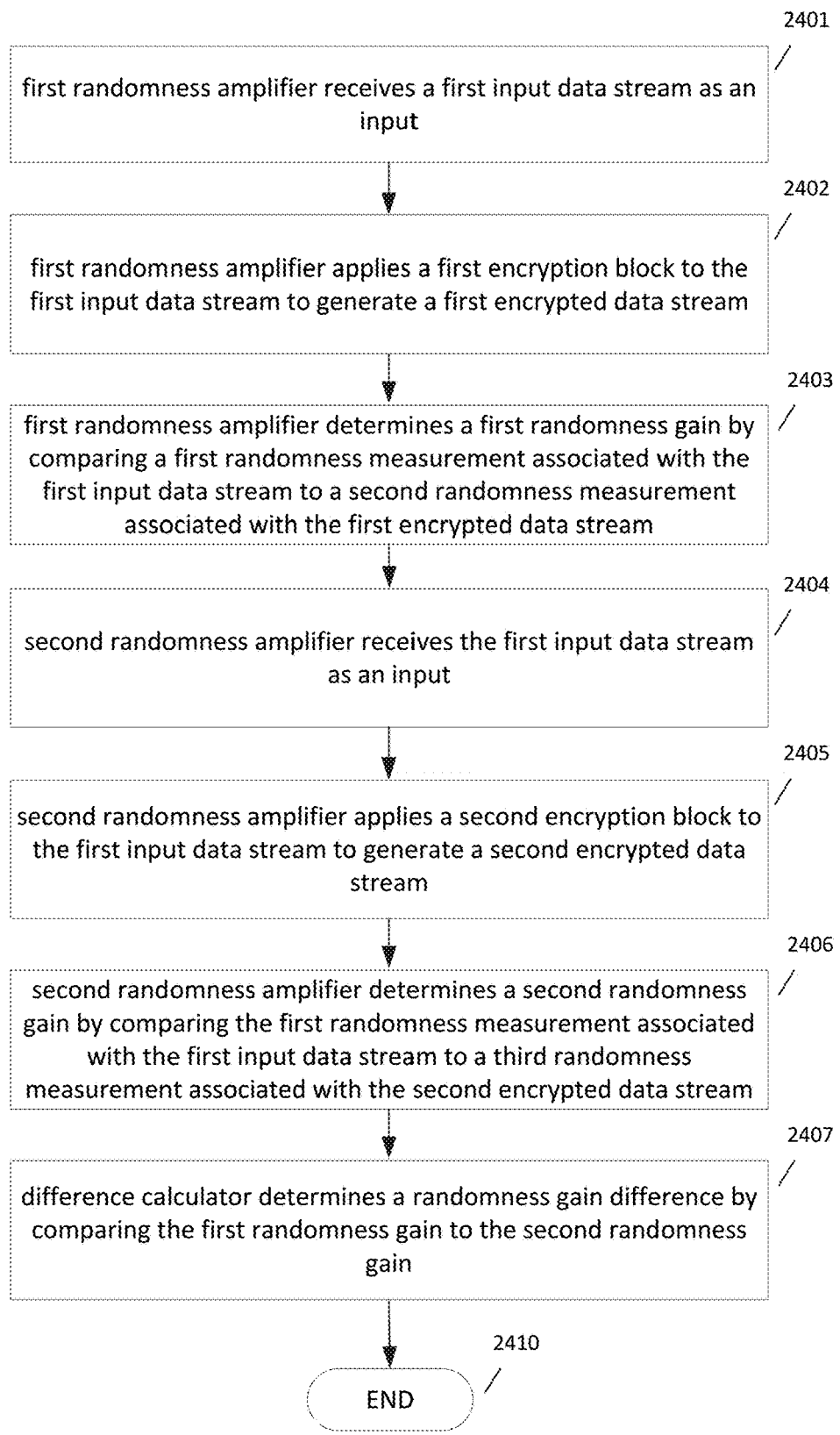
FIG. 24 is a flowchart depicting a process for a differential randomness comparator according to aspects of the invention.

FIG. 24 is a flowchart depicting a process for a differential randomness comparator according to an aspect. For example, the differential randomness comparator can determine a randomness gain difference between a first randomness gain associated with a first randomness amplifier and a second randomness gain associated with a second randomness amplifier. As seen in FIG. 24, the process begins at step 2401 in which a first randomness amplifier receives a first input data stream as an input. In step 2402, the first randomness amplifier applies a first encryption block to the first input data stream to generate a first encrypted data stream. Next, in step 2403, the first randomness amplifier determines a first randomness gain by comparing a first randomness measurement associated with the first input data stream to a second randomness measurement associated with the first encrypted data stream. The process then proceeds to step 2404 in which a second randomness amplifier receives a first input data stream as an input. In step 2405, the second randomness amplifier applies a second encryption block to the first input data stream to generate a second encrypted data stream. Next, in step 2406, the second randomness amplifier determines a second randomness gain by comparing the first randomness measurement associated with the first input data stream to a third randomness measurement associated with the second encrypted data stream. In step 2407, a difference calculator determines a randomness gain difference by comparing the first randomness gain to the second randomness gain. The process then ends at step 2410.

Figure 25:
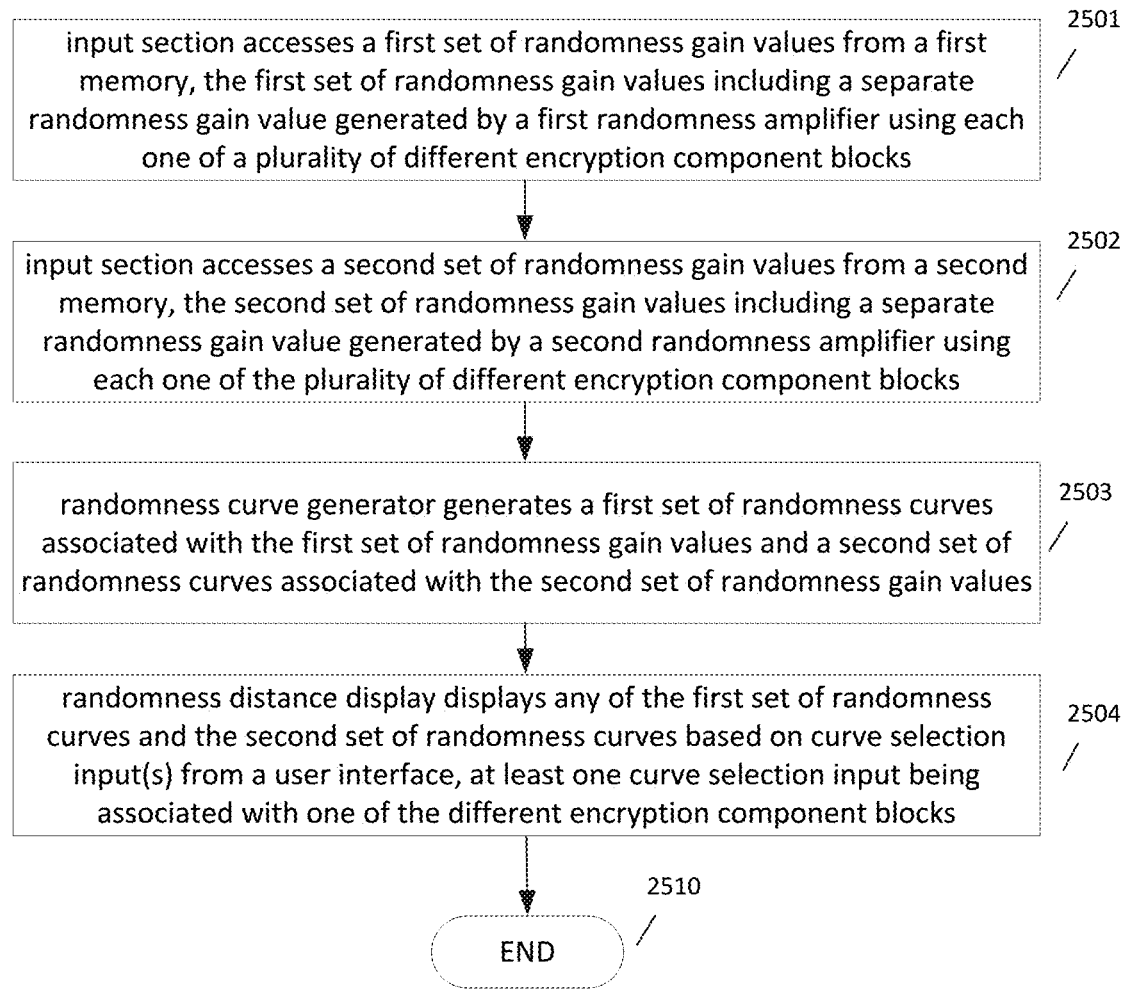
FIG. 25 is a flowchart depicting a process for a randomness scope according to aspects of the invention.

FIG. 25 is a flowchart depicting a process for a randomness scope according to an aspect. For example, the randomness scope can compare a first set of randomness gain values associated with a first randomness amplifier to a second set of randomness gain values associated with a second randomness amplifier. As seen in FIG. 25, the process begins at step 2501 in which an input section accesses the first set of randomness gain values from a first memory, the first set of randomness gain values including a separate randomness gain value generated by the first randomness amplifier using each one of a plurality of different encryption component blocks. Next, in step 2502, the input section accesses the second set of randomness gain values from a second memory, the second set of randomness gain values including a separate randomness gain value generated by the second randomness amplifier using each one of the plurality of different encryption component blocks. In step 2503, a randomness curve generator generates a first set of randomness curves associated with the first set of randomness gain values and a second set of randomness curves associated with the second set of randomness gain values. In step 2504, a randomness distance display is used to display any of the first set of randomness curves and any of the first set of randomness curves based on one or more randomness curve selection inputs from a user interface, wherein at least one randomness curve selection input is associated with one of the plurality of different encryption component blocks. The process then ends at step 2510.

Figure 18:
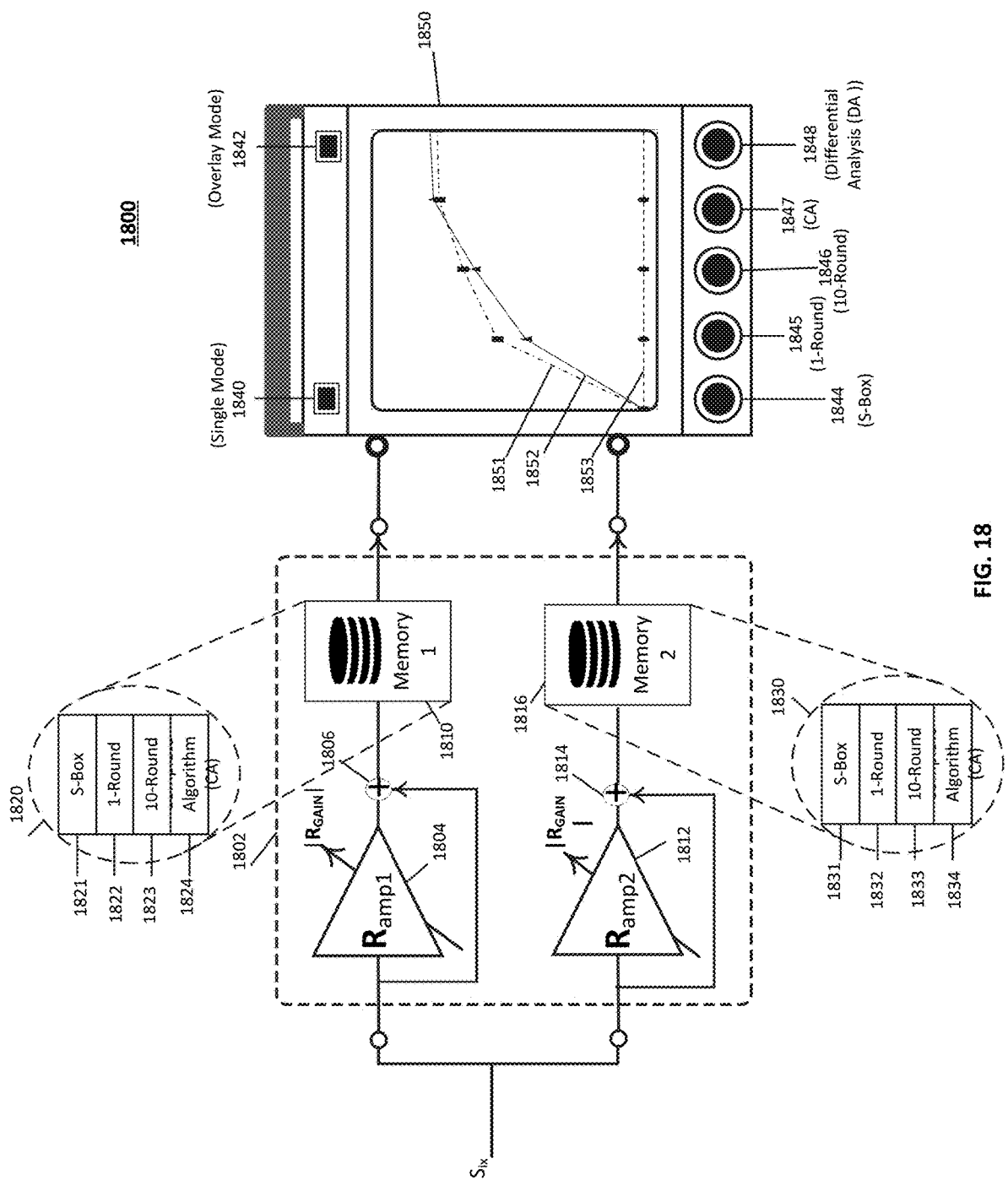
FIG. 18 is a top-level diagram of a differential randomness comparator with two randomness amplifiers having correlated artifacts subtracted from the output stream according to aspects of the invention.

FIG. 18 is top-level diagram of a differential randomness comparator with two randomness amplifiers in which correlated artifacts are subtracted from the output stream. As seen in FIG. 18, a differential randomness comparator 1802 is provided which benchmarks the $R_{GAIN}$ of an instance of one standard randomness amplifier 1804, such as an AES model, a MARS model (a known shared-key (symmetric) block cipher), or other known standard encryption or scrambling model instance of a randomness amplifier, against a second randomness amplifier 1812, such as a selectable or programmable encryption model instance of a randomness amplifier, thereby determining whether a pattern of differential behavior exists between randomness amplifier 1804 and selected/programmed randomness amplifier 1812, and also to thereby determine whether differential attacks are possible on either of randomness amplifiers 1804 and 1812. In this manner, selected/programmed randomness amplifier 1812 (which may apply an encryption model or method under investigation or analysis) can be benchmarked against standard randomness amplifier 1804. In differential randomness comparator 1802, correlated artifacts are subtracted from the output streams of randomness amplifier 1804 and randomness amplifier 1812 at junctions 1806 and 1814, respectively. Differential randomness comparator 1802 stores $R_{GAIN}$ values of S-box 1821, 1 Round 1822, n Rounds 1823 and Complete Method 1824 variants of Randomness Amplifier 1804 in Memory 1810, and similarly, Differential randomness comparator 1802 stores $R_{GAIN}$ values of S-box 1831, 1 Round 1832, n Rounds 1833 and Complete Method 1834 variants of Randomness Amplifier 1812 in Memory 1816. Randomness Scope 1850 reads the plurality of randomness gain values of the different variants of the two compared randomness amplifiers from Memories 1810 and 1816, respectively, and then plots R-Curves (1851, 1852 and 1853) of the two benchmarked randomness amplifiers and ILLUIZJA (a fake encryptor) on its randomness distance screen. A designer or analyst of an encryption circuit can select between Single Mode 1840 and Overlay Mode 1842 to choose between seeing the R-Curve of only one randomness amplifier or a plurality of more than one R-Curves, respectively. The designer or analyst of an encryption circuit or system or method can choose to benchmark S-box only, 1 Round only, n Rounds only or Complete Method variants of two randomness amplifiers by pressing S-box button 1844, 1 Round button 1845, n Rounds button 1846 or Complete Method button 1847, respectively. If the ($\Delta$) between the randomness gains of the two randomness amplifiers (for example, the first amplifier 1804 being coupled to an encryptor, and the second amplifier 1812 being coupled to an encryptor) is more than a threshold ($\delta$), then it is determined that one or more of the encryptor circuits or systems or algorithms are susceptible to differential attacks that eventually may be exploited by adversaries. R-Curves 1851, 1852 and 1853 represent the results of three different randomness amplifiers, respectively, where 1853 is an R-Curve of ILLUZIJA. R-Curves 1851 and 1852 on Randomness Scope 1850 show that both randomness amplifiers 1804 and 1812 are vulnerable to differential analysis attacks once their randomness gains are analyzed using the process invention of Deep Cipher Investigation (DCI). In such a state of compromise, encryption circuit designers could be enabled to take appropriate steps to mitigate the adverse effects of this type of security problem with the encryptor associated with each randomness compromised amplifier.

Those of skill in the art will appreciate that the various method steps, illustrative logical and functional blocks, modules, units, and algorithm steps described in connection with the aspects disclosed herein can often be implemented as electronic hardware, application specific integrated chip (ASIC), computer software, or combinations of all. To clearly illustrate this interchangeability of hardware and software, various illustrative components, blocks, modules, and steps have been described above generally in terms of their functionality. Whether such functionality is implemented as hardware or software depends upon the particular constraints imposed on the overall system and devices. Skilled persons can implement the described functionality in varying ways for each particular system, but such implementation decisions should not be interpreted as causing a departure from the scope of the invention described herein. In addition, the grouping of functions within a unit, module, block, or step is for ease of description. Specific functions or steps can be moved from one unit, module, or block without departing from the invention.

Some or all of the various illustrative methods, algorithms, logical and functional blocks, units, steps and modules described in connection with the aspects disclosed herein, and those provided in the accompanying documents, can be implemented or performed with a processor, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein, and those provided in the accompanying documents. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm and the processes of a block or module described in connection with the aspects disclosed herein, and those provided in the accompanying documents, can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC. Additionally, devices, blocks, or modules that are described as coupled may be coupled via intermediary devices, blocks, or modules. Similarly, a first device may be described as transmitting data to (or receiving from) a second device wherein there are intermediary devices that couple the first and second device and also wherein the first device is unaware of the ultimate destination of the data.

The above description of the disclosed aspects, and that provided in the accompanying documents, is provided to enable any person skilled in the art to make or use the invention. Various modifications to these aspects will be readily apparent to those skilled in the art, and the generic principles described herein, and in the accompanying documents, can be applied to other aspects without departing from the spirit or scope of the invention. Thus, it is to be understood that the description and drawings presented herein, and presented in the accompanying documents, represent particular aspects of the invention and are therefore representative examples of the subject matter that is broadly contemplated by the present invention. It is further understood that the scope of the present invention fully encompasses other aspects that are, or may become, understood to those skilled in the art based on the descriptions presented herein and that the scope of the present invention is accordingly not limited by the descriptions presented herein, or by the descriptions presented in the accompanying documents.

What we claim is:

1. A baseband processor of a communication device, the baseband processor comprising:
   an encryptor block that encrypts a transmit data stream into an encrypted data stream;
   at least one transmit chain block that transforms the encrypted data stream into an analog transmit signal; and
   a randomness inspector unit that is in communication with the encryptor block, the randomness inspector unit accessing the transmit data stream and the encrypted data stream from the encryptor block as first and second input streams, respectively, to the randomness inspector unit, and determining a randomness gain by comparing a first randomness measurement associated with the first input stream to a second randomness measurement associated with the second input stream.

2. The baseband processor of claim 1 wherein the randomness inspector unit determines the randomness gain by comparing the first randomness measurement associated with the first input stream to the second randomness measurement associated with the second input stream.

3. The baseband processor of claim 2 wherein the randomness inspector unit utilizes at least one randomness test block to determine the first randomness measurement associated with the first input stream and the second randomness measurement associated with the second input stream, and compares the first randomness measurement to the second randomness measurement to determine the randomness gain.

4. The baseband processor of claim 3 wherein the randomness inspector unit applies the first input stream to a plurality of test blocks to determine a first plurality of randomness test results, respectively, and the first randomness measurement is based on the first plurality of randomness test results, and applies the second input stream to the plurality of test blocks to determine a second plurality of randomness test results, respectively, and the second randomness measurement is based on the second plurality of randomness test results.

5. The baseband processor of claim 3 wherein the randomness inspector unit increments a first counter value for every instance that one of the at least one randomness test block results in a failed test associated with first input stream, and that increments a second counter value for every instance that one of the at least one randomness test block results in a failed test associated with second input stream.

6. The baseband processor of claim 4 wherein the randomness inspector unit determines the first randomness measurement based on the first plurality of randomness test results, and determines the second randomness measurement based on the second plurality of randomness test results, and determines the randomness gain by aggregating the first randomness measurement and the second randomness measurement.

7. The baseband processor of claim 6 wherein the randomness inspector unit determines a first penalty value based on a number of the first plurality of randomness test results that have a failed test result, and utilizes the first penalty value in the determination of the first randomness measurement, and wherein randomness inspector unit determines a second penalty value based on a number of the second plurality of randomness test results that have a failed test result, and utilizes the second penalty value in the determination of the second randomness measurement.

8. The baseband processor of claim 1 wherein the randomness inspector unit determines a gain differential between the randomness gain and a reference randomness gain.

9. The baseband processor of claim 8 wherein the randomness inspector unit determines whether the encryptor block is in a compromised state by comparing the gain differential to a predetermined threshold value.

10. The baseband processor of claim 1 wherein the at least one transmit chain block is comprised of a plurality of transmit chain blocks and an input switch connects an output data steam of one of the transmit chain blocks to a third input stream to the randomness inspector unit which further determines a second randomness gain by comparing the first randomness measurement associated with the first input stream to a third randomness measurement associated with the third input stream.

11. A method for determining a randomness gain associated with an encrypted data stream, the method comprising the steps of:
   encrypting a transmit data stream into the encrypted data stream;
   transforming the encrypted data stream into an analog transmit signal; and
   conducting a randomness inspection that includes the steps of accessing the transmit data stream and the encrypted data stream, and determining the randomness gain by comparing a first randomness measurement associated with the transmit data stream to a second randomness measurement associated with the encrypted data stream.

12. The method of claim 11 wherein the randomness gain is determined by comparing the first randomness measurement associated with the transmit data stream to the second randomness measurement associated with the encrypted data stream.

13. The method of claim 11 wherein the randomness inspection further includes the step of determining a gain differential between the randomness gain and a reference randomness gain.

14. The method of claim 13 wherein the randomness inspection further includes the step of determining whether the encrypting step is in a compromised state by comparing the gain differential to a predetermined threshold value.

15. The method of claim 11 wherein comparing the first randomness measurement associated with the transmit data stream to the second randomness measurement associated with the encrypted data stream includes a randomness evaluation step of applying at least one randomness test block to the transmit data stream to determine the first randomness measurement and applying the at least one randomness test block to the encrypted data stream to determine the second randomness measurement, and a randomness gain step of comparing the first randomness measurement to the second randomness measurement to determine the randomness gain.

16. The method of claim 15 wherein in the randomness evaluation step the transmit data stream is applied to a plurality of test blocks to determine a first plurality of randomness test results, respectively, and the first randomness measurement is based on the first plurality of randomness test results, and the encrypted data stream is applied to the plurality of test blocks to determine a second plurality of randomness test results, respectively, and the second randomness measurement is based on the second plurality of randomness test results.

17. The method of claim 16 wherein the randomness gain step includes determining the first randomness measurement based on the first plurality of randomness test results, and determining the second randomness measurement based on the second plurality of randomness test results, and determines the randomness gain by aggregating the first randomness measurement and the second randomness measurement.

18. The method of claim 17 wherein a first penalty value is determined based on a number of the first plurality of randomness test results that have a failed test result and utilizing the first penalty value in the determination of the first randomness measurement, and wherein a second penalty value is determined based on a number of the second plurality of randomness test results that have a failed test result and utilizing the second penalty value in the determination of the second randomness measurement.

19. The method of claim 15 wherein the randomness evaluation step increments a first counter value for every instance that one of the at least one randomness test block results in a failed test associated with transmit data stream, and increments a second counter value for every instance that one of the at least one randomness test block results in a failed test associated with encrypted data stream.

20. The method of claim 11 further including the step of processing the encrypted data stream with a transmit chain block to generate a processed encrypted data stream, wherein the randomness inspection step accesses the processed encrypted data stream and determines a second randomness gain by comparing the first randomness measurement associated with the transmit data stream to a third randomness measurement associated with the processed encrypted data stream.

* * * * *